United States Patent
Cao et al.

(10) Patent No.: US 11,096,028 B2
(45) Date of Patent: Aug. 17, 2021

(54) FRAME STRUCTURE FOR MACHINE-TYPE COMMUNICATIONS WITH ADJUSTABLE PULSE BANDWIDTH

(71) Applicant: Huawei Technologies Co., Ltd., Guangdong (CN)

(72) Inventors: Yu Cao, Kanata (CA); Ming Jia, Ottawa (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 1430 days.

(21) Appl. No.: 14/836,695

(22) Filed: Aug. 26, 2015

(65) Prior Publication Data
US 2017/0064700 A1    Mar. 2, 2017

(51) Int. Cl.
*H04W 4/70* (2018.01)
*H04W 72/12* (2009.01)

(52) U.S. Cl.
CPC ........... *H04W 4/70* (2018.02); *H04W 72/121* (2013.01)

(58) Field of Classification Search
CPC .......................... H04W 4/005; H04W 72/0446
USPC ......................................................... 370/329
See application file for complete search history.

(56) References Cited

U.S. PATENT DOCUMENTS

| | | | | |
|---|---|---|---|---|
| 9,137,201 B2* | 9/2015 | Sanders | ................ | H04J 3/1629 |
| 2009/0154532 A1* | 6/2009 | Shin | .................... | H04L 27/2675 |
| | | | | 375/150 |
| 2009/0219841 A1 | 9/2009 | Sudarshan et al. | | |
| 2013/0100899 A1 | 4/2013 | Kim et al. | | |
| 2013/0203450 A1* | 8/2013 | Mochizuki | ............ | H04W 68/02 |
| | | | | 455/458 |
| 2013/0258953 A1 | 10/2013 | Huang et al. | | |
| 2015/0110038 A1* | 4/2015 | Yang | .................... | H04W 72/042 |
| | | | | 370/329 |
| 2015/0282008 A1* | 10/2015 | Cao | ....................... | H04W 4/005 |
| | | | | 370/310 |
| 2015/0341934 A1* | 11/2015 | Sorrentino | ........... | H04B 7/2656 |
| | | | | 370/329 |
| 2015/0359036 A1 | 12/2015 | Seo et al. | | |

(Continued)

FOREIGN PATENT DOCUMENTS

| | | |
|---|---|---|
| CN | 101335731 A | 12/2008 |
| CN | 104205675 A | 12/2014 |
| CN | 104811220 A | 7/2015 |

(Continued)

OTHER PUBLICATIONS

3rd Generation Partnership Project; Technical Specification Group Radio Access Network; Study on provision of low-cost Machine-Type Communications (MTC) User Equipments (UEs) based on LTE (Release 12), 3GPP TR 36.88 V12.0.0, Jun. 2013, 55 pages.

*Primary Examiner* — Omar J Ghowrwal
*Assistant Examiner* — Kokou R Detse
(74) *Attorney, Agent, or Firm* — Slater Matsil, LLP

(57) ABSTRACT

Methods and systems for a frame structure for machine-type communications (MTC) with adjustable pulse bandwidth are described. In an embodiment, the frame structure is an uplink frame structure that illustrates a representation of a plurality of coverage levels. The coverage levels are associated with a coverage range of a base station. Each coverage level is associated with corresponding sub-frames, and each sub-frame within a coverage level has the same sub-frame length and bandwidth.

29 Claims, 10 Drawing Sheets

(56) References Cited

U.S. PATENT DOCUMENTS

2016/0198438 A1* 7/2016 Wong .................. H04L 5/0053
370/329

FOREIGN PATENT DOCUMENTS

| EP | 3308581 A1 | 4/2018 |
|----|------------|--------|
| WO | 2009000185 A1 | 12/2008 |
| WO | 2009105741 A3 | 8/2009 |
| WO | 2014116078 A1 | 7/2014 |
| WO | 2017032299 A1 | 3/2017 |

* cited by examiner

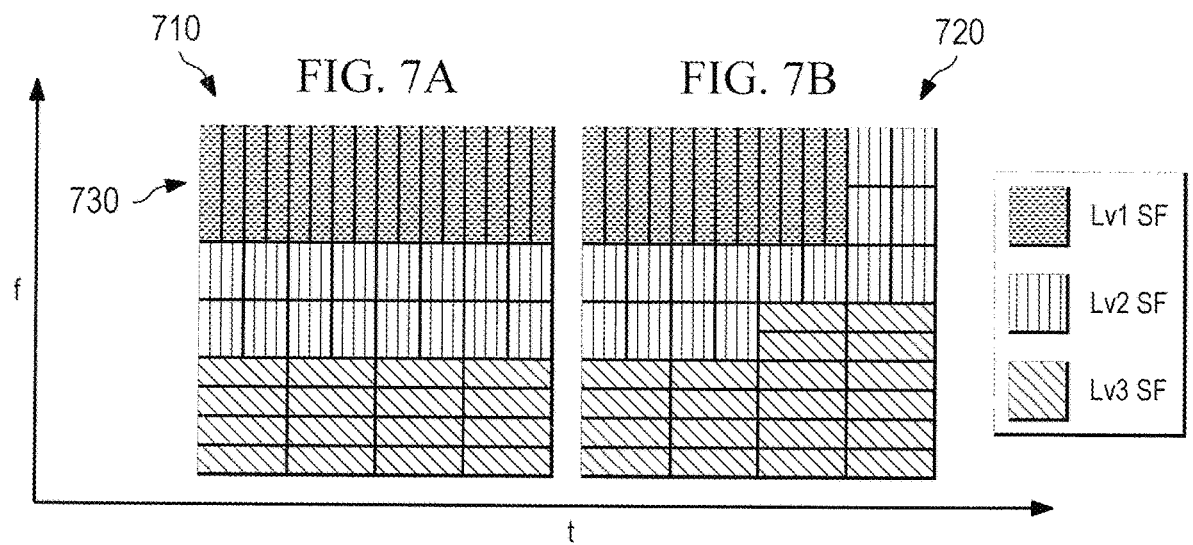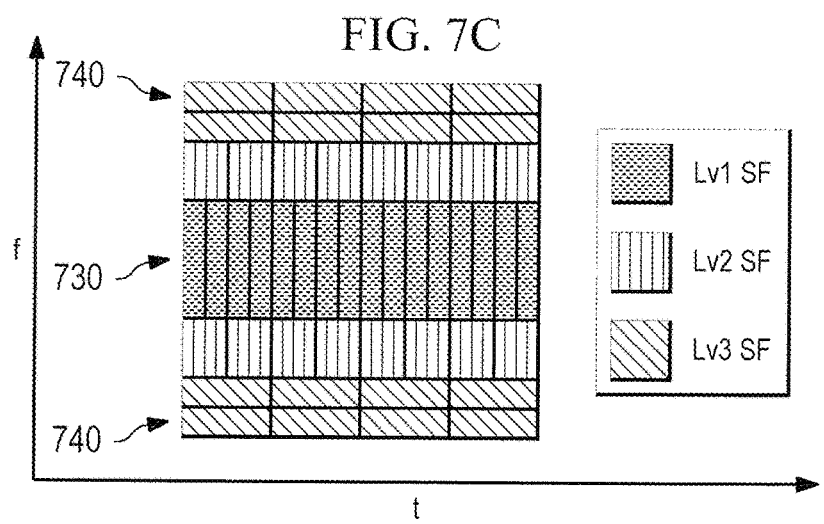

FIG. 10
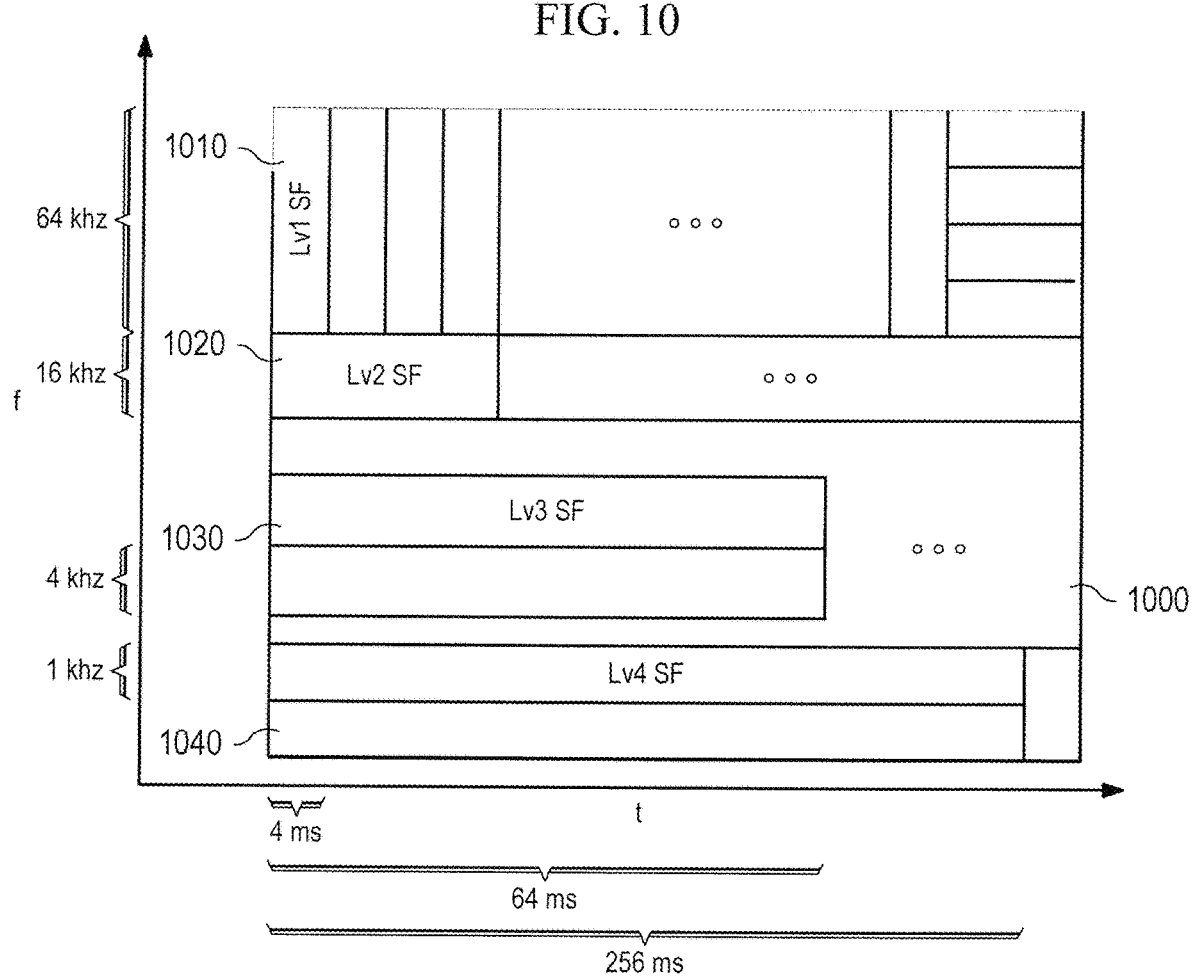
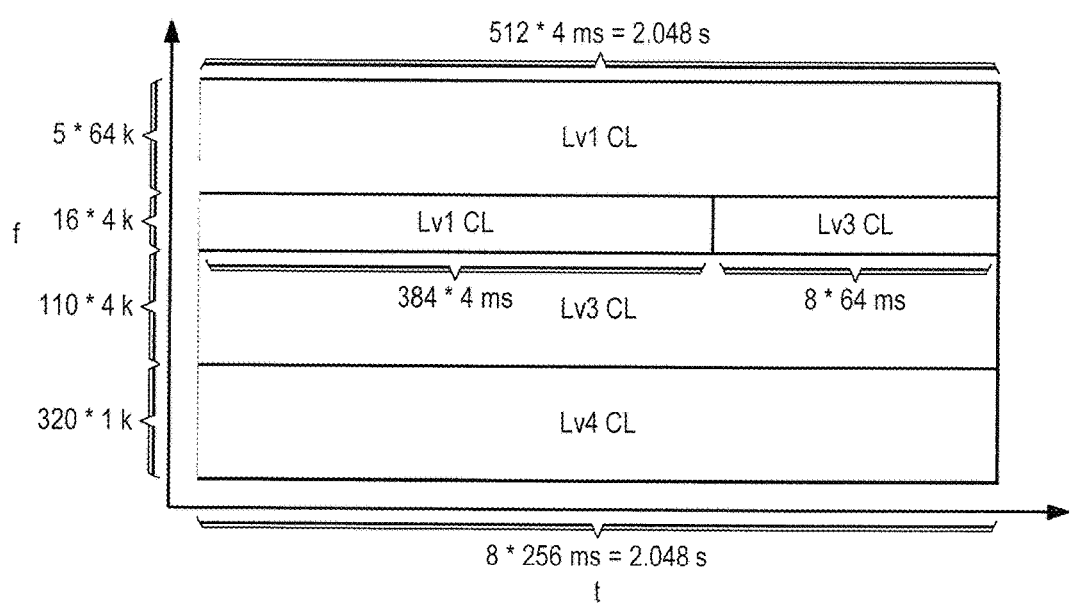
FIG. 11

FRAME STRUCTURE FOR MACHINE-TYPE COMMUNICATIONS WITH ADJUSTABLE PULSE BANDWIDTH

TECHNICAL FIELD

The present disclosure is generally directed to machine-type communications (MTC), and more particularly to a frame structure for MTC with adjustable pulse bandwidth.

BACKGROUND

In general, machine-to-machine (M2M) communications refers to machine-type communication devices (MTCDs) that communicate with each other or with a connected service without need for human intervention. In M2M communications, also commonly referred to as machine-type communications (MTC), machines or devices can directly communicate with one another or can make use of a common network, such as the Internet.

The M2M market is quickly growing, and some forecasts estimate that billions of MTCDs will be deployed in the coming decade. Applications for these MTCDs include smart metering, smart grid, surveillance, security, vehicle-to-vehicle communications, intelligent transportation system (ITS), e-health, industrial Internet, cloud computing, and the like.

Some of the challenges for MTC include:

1) Massive Connections. The number of connected MTC devices is growing. It is expected that the number of deployed MTC devices will increase by at least an order of magnitude within a decade. Many of these devices will rely upon a connection to a wireless network, which may overwhelm current Long Term Evolution (LTE) based wireless networks;

2) High coverage for supporting remote sensors. It has been estimated that the link budget of a network supporting a large number of MTC devices will need to be 15 dB to 20 dB above GSM 900/UMTS 900/LTE 800;

3) Cost of hardware. Due to a large number of meters and sensors, the cost per device needs to be low to enable successful commercial deployment;

4) Power Consumption. Many meters and sensors are expected to be powered by batteries, and some may have only intermittent access to other power sources. Due to the cost constraints and power limitations, it is expected that MTC devices may require a standby time in the target of several years for a single battery;

5) Asynchronous Transmission Mode. Currently deployed wireless networks typically rely upon a device coordinating with a base station to synchronize transmissions to defined time windows. This can be burdensome to implement in a low cost device with limited power supply. A reduction in signaling overhead caused by the need for synchronous transmissions would also be desirable; and 6) Signal Pulse Bandwidth. In the current LTE system, the frame structure is based on a fixed transition time interval (TTI) length. M2M systems need configurable signal pulse bandwidth design where the bandwidth and pulse length can vary to enable an acceptable tradeoff between throughput, energy efficiency, and the number of connected MTCDs.

Therefore, there is a need for a frame structure for MTC that can support diverse MTC applications and different coverage levels of MTCDs and for supporting MTC with large numbers of MTCDs while meeting the challenges described above.

SUMMARY

According to one embodiment, there is provided a frame structure for machine-type communication in a wireless communication system, the wireless communication system comprising a base station and a plurality of machine-type communication devices (MTCDs). The frame structure comprises at least one first sub-frame associated with a first MTCD of the plurality of MTCDs, the first MTCD within a first coverage level of the base station, the at least one first sub-frame having a first sub-frame length and a first signal pulse bandwidth; and at least one second sub-frame associated with a second MTCD of the plurality of MTCDs different from the first MTCD, the second MTCD within a second coverage level of the base station different from the first coverage level, the at least one second sub-frame having a second sub-frame length different from the first sub-frame length and a second signal pulse bandwidth different from the first signal pulse bandwidth.

In another embodiment, there is provided a method for providing a frame structure for machine-type communication in a wireless communication system, the communication system comprising a base station and a plurality of machine-type communication devices (MTCDs). The method comprises dividing, by the base station, a frame of time-frequency space into at least one first sub-frame and at least one second sub-frame, the at least one first sub-frame associated with a first MTCD of the plurality of MTCDs, the first MTCD within a first coverage level of the base station, the at least one first sub-frame having a first sub-frame length and a first signal pulse bandwidth; the at least one second sub-frame associated with a second MTCD of the plurality of MTCDs different from the first MTCD, the second MTCD within a second coverage level of the base station different from the first coverage level, the at least one second sub-frame having a second sub-frame length different from the first sub-frame length and a second signal pulse bandwidth different from the first signal pulse bandwidth; and transmitting, by the base station, information about the at least one first sub-frame and the at least one second sub-frame to the first MTCD.

In another embodiment, there is provided a base station for providing a frame structure for machine-type communication in a wireless communication system, the communication system comprising a plurality of machine-type communication devices (MTCDs) coupled to the base station. The base station comprises a processor; and memory coupled to the processor including instructions that, when executed by the processor, cause the base station to: divide a frame of time-frequency space into at least one first sub-frame and at least one second sub-frame, the at least one first sub-frame associated with a first MTCD of the plurality of MTCDs, the first MTCD within a first coverage level of the base station, the at least one first sub-frame having a first sub-frame length and a first signal pulse bandwidth; the at least one second sub-frame associated with a second MTCD of the plurality of MTCDs different from the first MTCD, the second MTCD within a second coverage level of the base station different from the first coverage level, the at least one second sub-frame having a second sub-frame length different from the first sub-frame length and a second signal pulse bandwidth different from the first signal pulse bandwidth; and transmit information about the at least one first sub-frame and the at least one second sub-frame to the first MTCD.

In yet another embodiment, there is provided a method for operating a machine-type communication device (MTCD)

in a wireless communication system, the communication system comprising a base station coupled to a plurality of MTCDs. The method comprises receiving, by a first MTCD of the plurality of MTCDs, information associated with a frame of time-frequency space divided into at least one first sub-frame and at least one second sub-frame from the base station, the at least one first sub-frame associated with a first coverage level of the base station within which the first MTCD is in, the at least one first sub-frame having a first sub-frame length and a first signal pulse bandwidth, the at least one second sub-frame associated with a second MTCD of the plurality of MTCDs different from the first MTCD, the second MTCD within a second coverage level of the base station different from the first coverage level, the at least one second sub-frame having a second sub-frame length different from the first sub-frame length and a second signal pulse bandwidth different from the first signal pulse bandwidth; generating, by the first MTCD, a packet including data, the packet generated in accordance with the at least one first sub-frame and the at least one second sub-frame; and transmitting, by the first MTCD, the packet to the base station.

In still another embodiment, there is provided a first machine-type communication device (MTCD) for communicating in a wireless communication system, the communication system comprising a base station coupled to a plurality of MTCDs. The first MTCD comprises a processor; and memory coupled to the processor including instructions that, when executed by the processor, cause the first MTCD to: receive information associated with a frame of time-frequency space divided into at least one first sub-frame and at least one second sub-frame from the base station, the at least one first sub-frame associated with a first coverage level of the base station within which the first MTCD is in, the at least one first sub-frame having a first sub-frame length and a first signal pulse bandwidth, the at least one second sub-frame associated with a second MTCD of the plurality of MTCDs different from the first MTCD, the second MTCD within a second coverage level of the base station different from the first coverage level, the at least one second sub-frame having a second sub-frame length different from the first sub-frame length and a second signal pulse bandwidth different from the first signal pulse bandwidth; generate a packet including data, the packet generated in accordance with the at least one first sub-frame and the at least one second sub-frame; and transmit the packet to the base station.

BRIEF DESCRIPTION OF THE DRAWINGS

For a more complete understanding of the present disclosure, and the advantages thereof, reference is now made to the following description taken in conjunction with the accompanying drawings, wherein like numbers designate like objects, and in which:

FIG. 7A illustrates a frequency division multiplexing frame partition method according to disclosed embodiments;

FIG. 7B illustrates a frequency division multiplexing and time division multiplexing frame partition method according to disclosed embodiments;

FIG. 7C illustrates sub-frame placement within a frame according to disclosed embodiments;

FIG. 10 illustrates different levels of sub-frames inside an uplink frame according to disclosed embodiments;

FIG. 11 illustrates frame partition based on FDM and TDM according to disclosed embodiments;

DETAILED DESCRIPTION

Figure 1A:
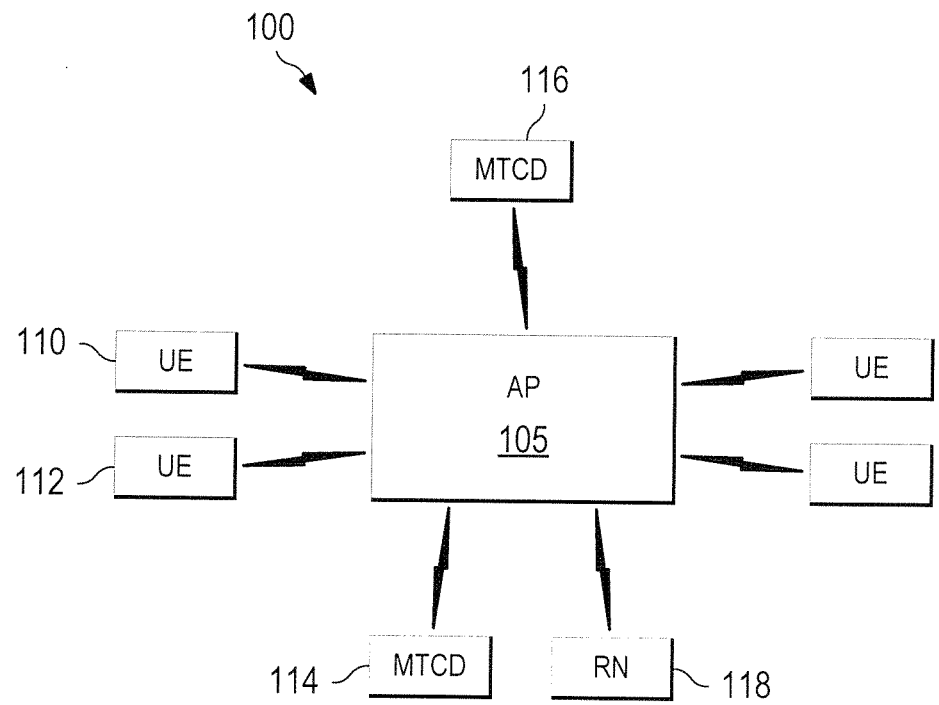
FIG. 1A illustrates a portion of a first example communications system according to disclosed embodiments.

FIG. 1A illustrates a portion of a first example communications system 100. The communications system 100 may include a network device 105, user equipment (UE), such as a UE 110 and a UE 112, as well as machine-type communications devices (MTCDs), such as a MTCD 114 and a MTCD 116. The network device 105 is configured to wirelessly interface with one or more of the UEs 110, 112 and the MTCDs 114, 116 and may include (or be) one or more of several well-known devices, such as a base transceiver station (BTS), a Node B, an evolved Node B (eNB), a Home Node B, a Home eNB, a site controller, an access point (AP), or a wireless router. Similarly, the UEs 110, 112 are configured to transmit and/or receive wireless signals. Each UE 110, 112 may represent any suitable end user device and may include such devices (or may be referred to) as a wireless transmit/receive unit (WTRU), mobile station, fixed or mobile subscriber unit, pager, cellular telephone, personal digital assistant (PDA), smartphone, laptop, computer, touchpad, or wireless sensor. The communications system 100 may also include a relay node (RN) 118 that is capable of utilizing a portion of the resources of the network device 105 to help improve coverage and/or overall performance of communications system 100.

While it is understood that communications systems may employ multiple network devices capable of communicating with a number of devices, only one network device, one RN, and a number of UEs and MTCDs are illustrated for simplicity.

One common application for MTCD and MTC involves the use of MTCDs as sensors that occasionally or periodically report information to a centralized entity through MTC with a network device. Examples of such an application may include e-health monitors, smart meters, security system monitors, fire monitors, weather monitors, home automation monitors, vehicle monitors, and the like. In such an application, the MTCDs generally have very low data bandwidth requirements since their reports are usually on the order of tens or hundreds of bytes in size and normally occur infrequently. Although individual MTCDs have low communications requirements, they are typically deployed in very large numbers. Hence, the overall communications requirements may be large and difficult to handle effectively.

Figure 1B:
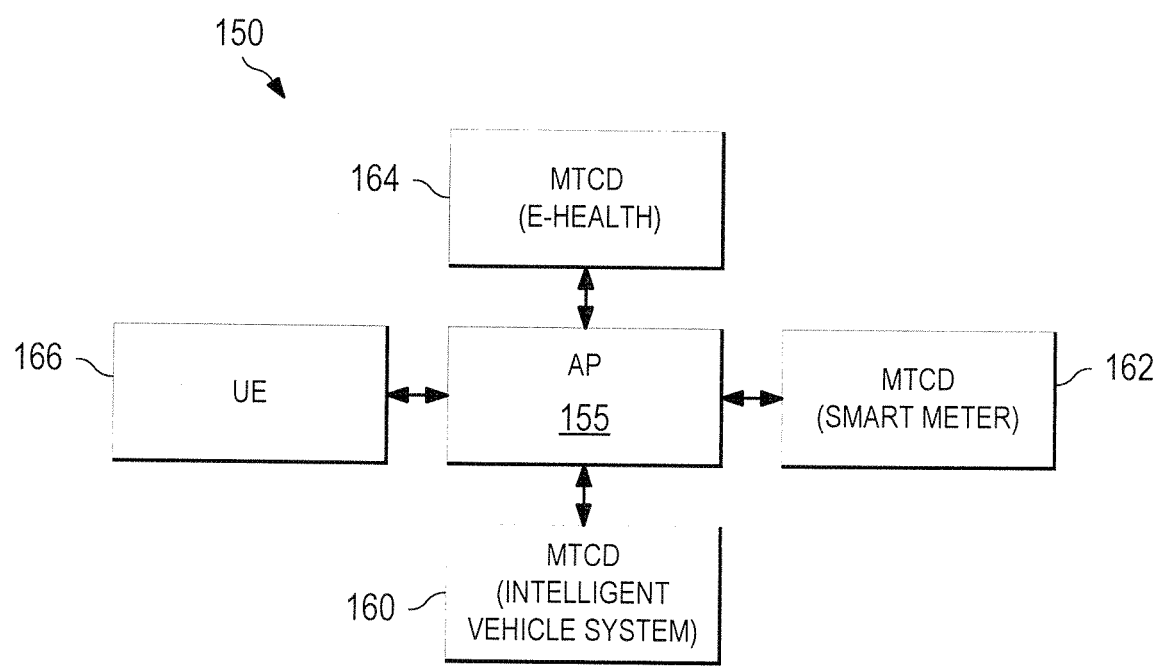
FIG. 1B illustrates a portion of a second example communications system that depicts M2M communication according to disclosed embodiments.

FIG. 1B illustrates M2M communication in a portion of a second example communications system 150. The communications system 150 includes a base station 155 serving both UEs and MTCDs. As discussed previously, individual MTCDs may have low communications requirements when compared to UEs. However, when there are large numbers of MTCDs, their collective communications requirements may be very large and hard to handle in an efficient manner. As shown in FIG. 1B, the base station 155 is serving an MTCD 160 that is a part of an intelligent vehicle system, an MTCD 162 that is a smart meter, an MTCD 164 that is part of an e-health system, and a UE 166. It is noted that the communications system 150 may include other UEs and MTCDs, but only a limited number are illustrated to simplify discussion.

Depending on applications executing on the UE 166, communications between the base station 155 and the UE 166 may be interactive and involve large numbers of uplink (communications from the UE 166 to the base station 155) and downlink (communications from the base station 155 to the UE 166) transmissions. As an illustrative example, if the UE 166 is streaming a video and providing constant social media updates, hundreds of megabytes of information may be exchanged between the base station 155 and the UE 166 per hour.

However, MTC between the base station 155 and the MTCD that it is serving may involve a much smaller amount of data. As an illustrative example, the MTCD 162 may transmit power usage information to the base station 155 (which will forward the information to a server associated with the MTCD 162) once every few seconds, few tens of seconds, or few minutes. Furthermore, the power usage information may be only a few bytes in size. Similarly, the MTCD 164 may transmit health information to the base station 155 only if it detects an anomaly in the health information of a patient it is monitoring. Therefore, most of the time, the MTCD 164 may not even have to transmit any information. However, there may be a large number of MTCDs, hence, the resultant MTC requirements may be large and hard to handle efficiently.

Figure 1C:
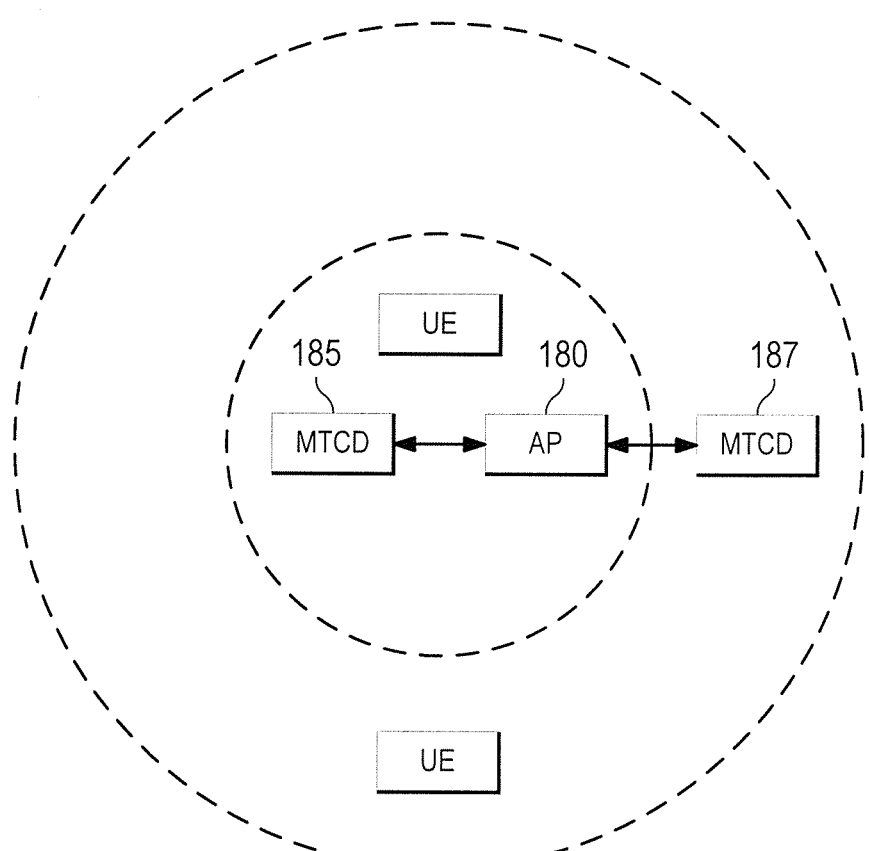
FIG. 1C illustrates a portion of a third example communications system depicting coverage range with MTCDs and MTC according to disclosed embodiments.

FIG. 1C illustrates a portion of a third example communications system 175 depicting coverage range with MTCDs and MTC. The communications system 175 includes a base station 180 serving a first MTCD 185 and a second MTCD 187. The first MTCD 185 is operating relatively close to the base station 180, while the second MTCD 187 is operating remotely from the base station 180. Because the second MTCD 187 is located far away from the base station 180 (when compared to the first MTCD 185), extended coverage (or similarly, extended range) is needed to provide coverage for the second MTCD 187.

In a cellular communications system, such as a 3GPP Long Term Evolution (LTE) compliant communications system, uplink transmissions from various UEs are adjusted with respect to timing to avoid interference between UEs with uplink transmissions scheduled on the same sub-frame and to help ensure that the transmissions arrive at the base station at the same time. The strict synchronous operation requirement arises from the rectangular pulses used in orthogonal frequency division multiplexed (OFDM) communication that present large side lobes in the frequency domain. Therefore, communications systems utilizing OFDM require synchronization in the time domain and the frequency domain to retain orthogonality among the different subcarriers.

However, for MTCDs, which may be inactive for extended amounts of time, maintaining synchronization may require a significant amount of additional complexity. Furthermore, MTC traffic usually occurs in short packets, and the signaling overhead associated with synchronization may be large with respect to the small amount of data. Hence, asynchronous operation is a desired feature.

In an embodiment, in order to support the sharing of available communications resources (e.g., time resources, frequency resources, or time-frequency resources), narrow band communications may be used. In general, narrow band communication systems use channels (or frequency bands) that do not exceed or significantly exceed the channels' coherence bandwidth. The channels' coherence bandwidth may be defined as the range of frequencies over which two frequency components have a strong amplitude correlation. Transmissions from a single MTCD occupy a single narrow band channel that does not overlap with other narrow band channels. Multiple access techniques, such as frequency division multiple access (FDMA), code division multiple access (CDMA), time division multiple access (TDMA), carrier sense multiple access (CSMA), CSMA with collision detection (CSMA/CD), and the like, may be used to allow more than one MTCD to share communication resources and increase the number of MTCDs supported. Furthermore, a single carrier is used. Offset Quadrature Amplitude Modulation (OQAM) may be used to modulate the information being transmitted. It will be appreciated that other modulation techniques, such as Quadrature Phase Shift Keying (QPSK), MSK (minimum shift keying), Quadrature Amplitude Modulation (QAM), and the like, may be used.

The use of single carrier modulation may offer a lower peak to average power ratio (PAPR) and/or complexity than multicarrier waveforms. Also, offset modulation, such as OQPSK, may be more efficient for nonlinear power amplifiers due to the 90 degree phase shift in OQPSK rather than the 180 degree phase shift for regular QPSK. Therefore, hardware to support the MTC may be more energy efficient, providing a low power and low cost implementation.

A frequency localized pulse shaping filter may be used to minimize out-of-band emissions. Minimizing the out-of-band emissions of the MTCDs may allow for asynchronous transmissions by multiple MTCDs without causing interference to each other. An example of a frequency localized pulse shaping filter is a root raised cosine filter. It will be appreciated that other filters may be used, for example, the isotropic orthogonal transform algorithm (IOTA) filter. Additionally, guard tones may be used between transmissions of different MTCDs to enable interference free asynchronous transmission due to the low out-of-band emission of the pulses, which ensures orthogonality of the waveforms from different MTCDs by separating them in the frequency domain. The guard tones may be with respect to OFDM and/or OQAM.

In an embodiment, the signal waveform of generalized frequency division multiplexing (GFDM) or single carrier GFDM (SC-GFDM) may be used in an MTC communications system. SC-GFDM has a very low peak-to-average power ratio (PAPR). Hence, SC-GFDM may be a good candidate for use in an MTC communications system.

In an embodiment, in order to achieve extended or enhanced coverage for low signal to interference plus noise ratio (SINR) MTCDs, ultra-narrow band transmissions with long signaling pulses are used in place of repetition. Additionally, transmission pulse bandwidth can be adjustable based on MTCD power needs or communications system conditions such as system load. The adjustment of the transmission bandwidth can enable energy consumption savings.

Usually, in power limited situations, narrower bandwidths may allow the MTCD to concentrate the transmit power in a narrow spectrum, thereby increasing the transmit power spectrum density. In the time domain, the longer pulse means that energy per symbol can be accumulated over a longer period of time, thereby increasing the signal to noise ratio (SNR). Increasing the bandwidth of the channel does not necessarily gain extra throughput. However, reducing the bandwidth of a channel allows more MTCDs to transmit by permitting more available channels. Therefore, for low SINR MTCDs, using narrow band channels is an effective technique to improve coverage while allowing as many MTCDs to communicate as possible.

Figure 2:
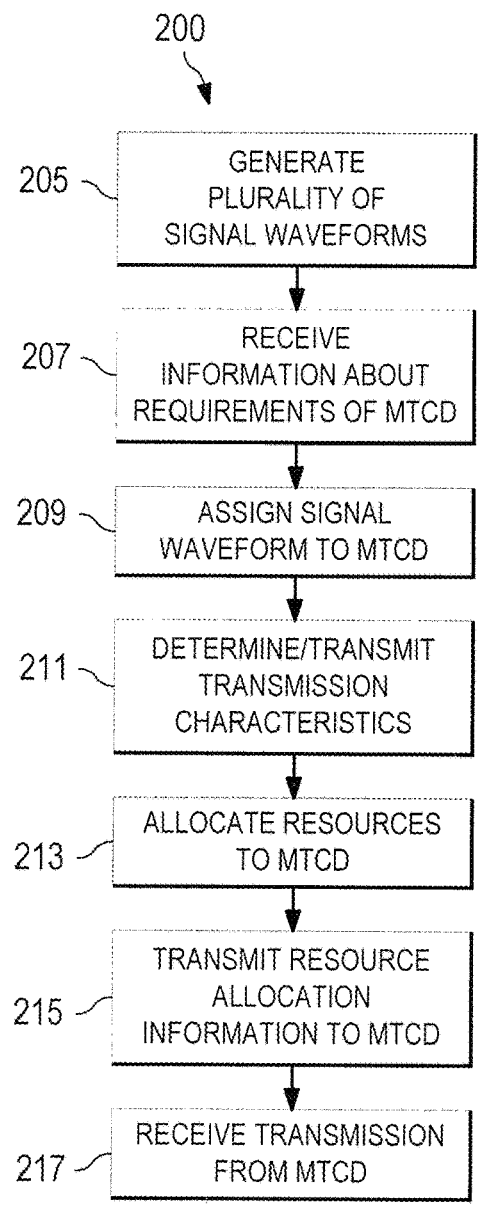
FIG. 2 illustrates a flow diagram of example operations occurring in an access point (AP) as the AP participates in MTC according to disclosed embodiments.

FIG. 2 illustrates a flow diagram of example operations 200 occurring in an AP as the AP participates in MTC. Operations 200 may be indicative of operations occurring in an AP, such as APs 105, 155, and 180, as the AP participates in MTC with an MTCD.

Operations 200 begin with the AP, which is configured to generate a plurality of signal waveforms (block 205). The plurality of signal waveforms may include single carrier waveforms, multi-carrier waveforms, single carrier narrow-band waveforms, single carrier ultra-narrow band waveforms, and the like, with potentially different bandwidths. Some types of waveforms may have multiple different bandwidths, while other types may have a single bandwidth. The particular configuration of the signal waveforms in the plurality of signal waveforms may depend on implementation, communications system capability, modulation and coding scheme (MCS) levels supported, and the like.

The AP receives information about the communications requirements of an MTCD (block 207). As an example, the AP may receive the information about the communications requirements of the MTCD during an initial attachment procedure that is performed with the MTCD. As another example, the AP may receive the information about the communications requirements of the MTCD during a handover procedure that is performed with the MTCD. As yet another example, the AP may receive the information about the communications requirements of the MTCD when the MTCD updates and changes its communications requirements. As an illustrative example, the communications requirements of the MTCD may include parameters such as a frequency or period of transmissions from the MTCD, an amount of information transmitted per transmission, a bandwidth requirement of the MTCD, a priority level of the MTCD, and the like. The priority level may be based on the MTCD's distance from the AP. MTCDs that are farther away from the AP may be given a higher priority because their batteries tend to deplete faster due to operation under low bandwidth conditions. In addition, the AP may receive information about other parameters such as communications system load, MTCD power consumption, and the like. The other parameters may be communicated along with the information about the communications requirements, or may be communicated separately to the AP.

The AP assigns a signal waveform out of the plurality of signal waveforms to the MTCD (block 209). The assignment of the signal waveform may be in accordance with communications requirements of the MTCD. According to an embodiment, multiple signal waveforms may be assigned to the MTCD. As an illustrative example, if the MTCD has different communications requirements, more than one signal waveform may be assigned to the MTCD to meet the different communications requirements. The AP may determine transmission characteristics for the MTCD, e.g., the bandwidth and/or an MCS level, and transmit the transmission characteristics to the MTCD (block 211). As an example, an MTCD that has high bandwidth requirements may be assigned a signal waveform with a wide bandwidth. Furthermore, the AP may assign the signal waveform with the MCS level set in accordance with the allocated bandwidth. As an illustrative example, if the MTCD is a sensor that transmits 1 kilobit of data once every 10 seconds, the AP may allocate a channel having a maximum bit rate of 100 kilobits per second to the MTCD so that it can transmit its 1 kilobit of data in about 0.01 seconds. Alternatively, the AP may assign the signal waveform in accordance with factors such as an MTCD type, an MTCD priority, a communications system load, and the like. As an illustrative example, the AP may be configured to generate the plurality of signal waveforms, with each signal waveform corresponding to a different MTCD type, and transmit an indicator of the signal waveform to the MTCD.

Figure 4:
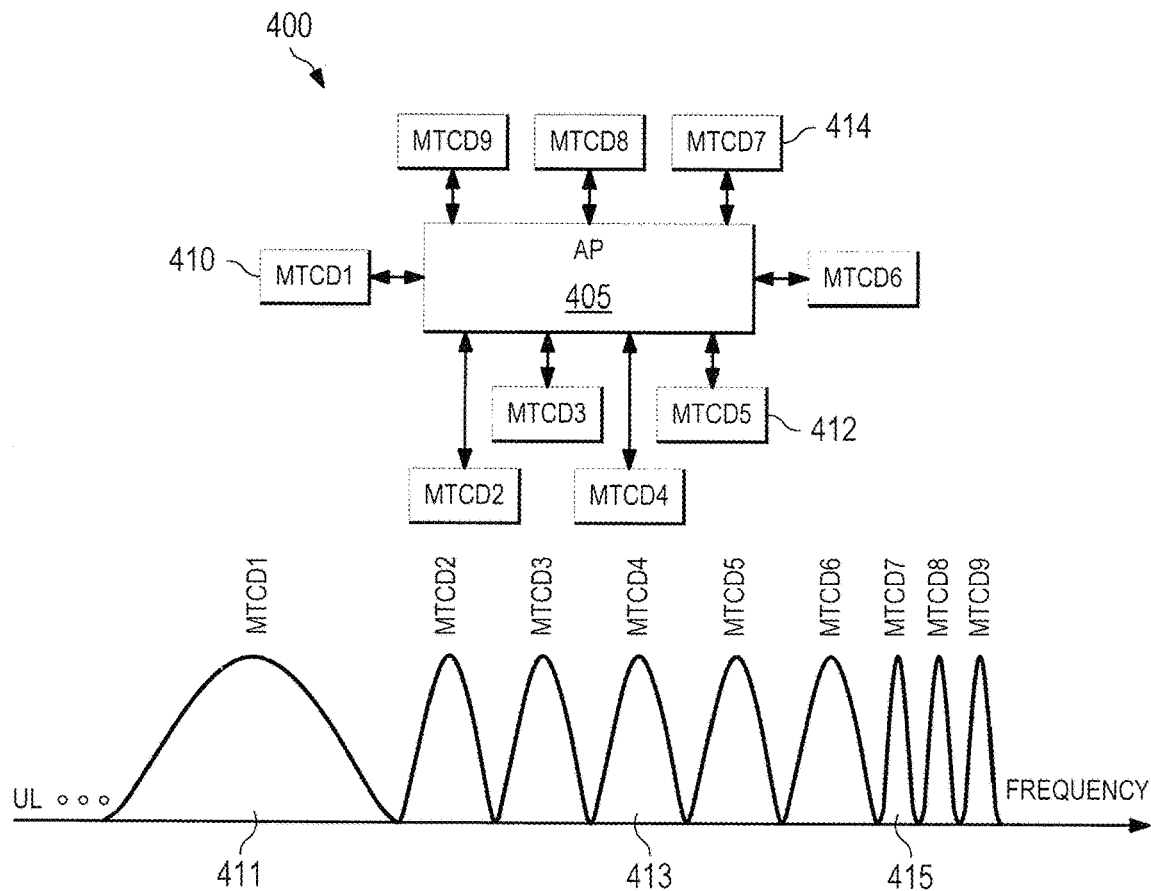
FIG. 4 illustrates a diagram of example communications resources in a communications system according to disclosed embodiments.

The AP may allocate one or more communications resources to the MTCD in accordance with the communications requirements (block 213). As an illustrative example, the AP may allocate time-frequency resources commensurate with the communications requirements of the MTCD and/or the communications characteristics for the MTCD. The AP may also consider the communications requirements of other MTCDs served by the AP, as well as other factors, such as communications system load, communications system condition, and the like, as it allocates communications resources. The allocation of the resources may be a persistent or semi-persistent allocation to meet the on-going communications requirements of the MTCD. As an illustrative example, the AP may allocate the time-frequency resources in a periodic manner based on the frequency or period of the transmissions as specified by the MTCD. FIG. 4 illustrates a diagram of example communications resources 400 in a communications system. Communications resources 400 may include resources for uplink transmissions and downlink transmissions. Some of the communications resources may be allocated for MTC, while other communications resources are allocated for other network communications such as mobile broadband services. The AP may allocate one or more of the communications resources to the MTCD.

Referring back to FIG. 2, the AP transmits resource allocation information to the MTCD (block 215). The resource allocation information may specify where and when the allocated communications resource can be retrieved by the MTCD. As an illustrative example, the resource allocation information may include a time, a frequency, a frame number, and the like, so that the MTCD knows where and when to transmit. The resource allocation information may be transmitted to the MTCD during the attachment procedure, the handover procedure, broadcast to the MTCD, and the like. The AP may receive a transmission from the MTCD in accordance with the resource allocation information (block 217). The transmission may be transmitted using the signal waveform assigned in block 209.

Figure 3:
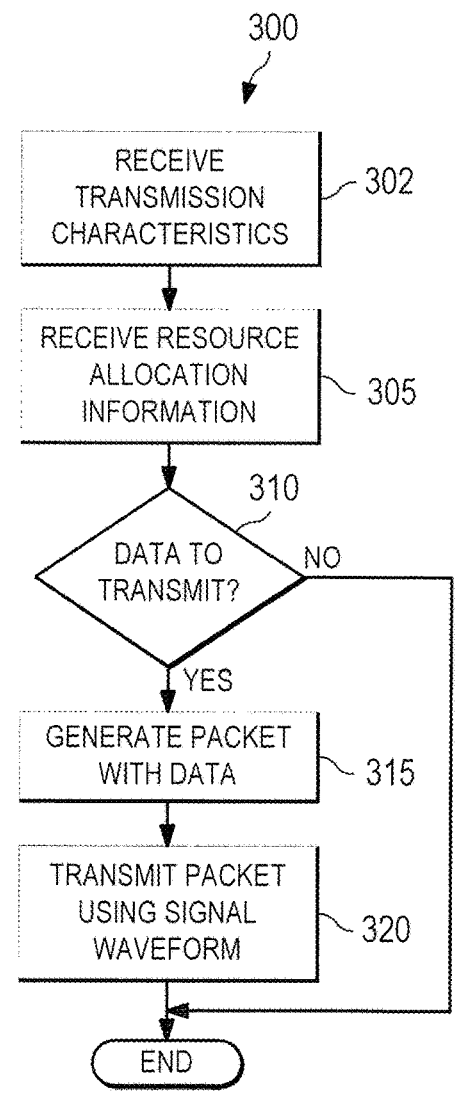
FIG. 3 illustrates a flow diagram of example operations occurring in an MTCD as the MTCD participates in MTC according to disclosed embodiments.

FIG. 3 illustrates a flow diagram of example operations 300 occurring in an MTCD as the MTCD participates in MTC. The MTCD may be the MTCD 114, the MTCD 116, the MTCD 160, the MTCD 162, the MTCD 164, the MTCD 185, or the MTCD 187, or any other suitable communication device.

Operations 300 may begin with the MTCD receiving transmission characteristics from an AP (block 302). The transmission characteristics, e.g., bandwidth allocation and/or MCS, may provide the MTCD information about the signal waveform to be used by the MTCD, as well as a MCS level to be used for the transmission. For example, the AP may assign the signal waveform with the MCS level set in accordance with the allocated bandwidth. The transmission characteristics may be received during an initial attachment procedure, a handover procedure, and the like. Alternatively, the transmission characteristics may be received after the AP adjusts the bandwidth and/or MCS level of the signal waveform to meet changing communications system load. According to an embodiment, the MTCD may receive information about multiple signal waveforms if multiple signal waveforms were assigned to the MTCD.

The MTCD receives resource allocation infatuation from the AP (block 305). The resource allocation information may specify where and when the allocated communications resource can be retrieved by the MTCD. As an illustrative example, the resource allocation information may include a time, a frequency, a frame number, and the like, so that the MTCD knows where and when to transmit. The resource allocation information may have been generated by the AP in response to communications requirements of the MTCD, which may have been provided by the MTCD. Alternatively, the communications requirements of the MTCD may be one of several default communications requirements associated with MTCD type, priority, and the like.

The MTCD may receive the resource allocation information during the attachment procedure, the handover procedure, in a broadcast or transmission to the MTCD, and the like. The MTCD performs a check to determine if it has data (information) to transmit (block 310). If the MTCD has data to transmit, the MTCD may generate a packet including the data (block 315). The generation of the packet may include placing the data into a payload of the packet, adding a header and/or a footer along with control information, encoding to provide error detection and/or correction, and the like. The MTCD transmits the generated packet in accordance with the resource allocation information (block 320). Transmitting the generated packet may include operations such as digital to analog conversion, filtering with a frequency localized pulse shaping filter, modulation, signal amplification, and the like. The transmission of the packet may make use of the signal waveform assigned in block 302.

According to an embodiment, the bandwidth allocated to an MTCD may be varied (adjusted) to meet communications requirements of the MTCD and/or communications system conditions. As discussed previously, if maximizing the number of MTCDs supported is a goal, when the MTCDs are limited in power, a narrow bandwidth is typically advantageous as it boosts total transmit power or power spectrum density, thereby allowing the support of more MTCDs. However, the use of narrow bandwidths for all MTCDs restricts performance for MTCDs that are not power limited or MTCDs that have good channel conditions (i.e., good channel SINR). Additionally, power consumption in an MTCD typically increases when transmitting data using a narrow bandwidth channel when compared to transmitting the data using a wide bandwidth channel because the MTCD takes longer to transmit the data when using the narrow bandwidth channel. Furthermore, in a communications system that uses a fixed size guard band, the fixed size guard band consumes greater overhead when used in conjunction with a narrow bandwidth channel (especially when the guard band is wider than the narrow bandwidth channel) then when used with a wide bandwidth channel. Also, limitations on throughput may prevent the support of diverse MTCDs that require different data rates. In addition, energy consumption is usually important in MTC applications since many sensors are battery powered and battery life is an important consideration in designing MTCD systems.

When the communications system is under loaded, signal waveforms with larger bandwidths may be assigned to MTCDs to improve energy efficiency, while when the communications system is overloaded, signal waveforms with narrow bandwidths may be used to support as many MTCDs as possible. Hence, a bandwidth adjusting technique may consider both long term channel characteristics of MTCDs, such as SINR, as well as the load of the communications system. In addition, energy efficiency of remote MTCDs may be more important than energy efficiency of close MTCDs since they may be more likely to run out of battery due to increased transmission time for the same data load.

FIG. 4 illustrates a diagram of a communications system 400 that supports adjustable bandwidth for MTCDs. Communications system 400 includes an AP 405 communicating with a plurality of MTCDs. Distance between AP 405 and the MTCDs differ, therefore, the channel condition for the MTCDs may also differ. As an illustrative example, an MTCD 410 is closer to the AP 405 than an MTCD 412, and the MTCD 412 is closer to the AP 405 than an MTCD 414. In this example, the MTCD 410 has a high SINR channel due to its distance from the AP 405, the MTCD 412 has a medium SINR channel due to its distance from the AP 405, and the MTCD 414 has a low SINR channel due to its distance from the AP 405.

As discussed previously, the AP 405 may be able to adjust the bandwidths used for MTC in accordance with the channel condition of the MTCDs as well as the load of communications system 400. For illustrative purposes, consider a situation where the communications system 400 is lightly loaded and permits the adjustment of bandwidths. Then, if the MTCD 410 with a high SINR channel has use for more bandwidth, its bandwidth can be increased (as shown in pulse 411) in accordance with its channel condition. Similarly, if the MTCD 412 with a medium SINR channel has use for more bandwidth, its bandwidth can be increased (shown as pulse 413) in accordance with its channel condition, but not to the extent of the maximum bandwidth available to the MTCD 410. However, if the MTCD 414 with a low SINR channel has use for more bandwidth, its bandwidth might not be increased (as shown in pulse 415) in this example due to its channel condition. Instead, the MTCD 414 may need to rely upon a signal waveform with a narrow bandwidth and long pulse signaling to obtain extended coverage from the AP 405. In other examples, if the MTCD 414 with the low SINR channel has use for more bandwidth, its bandwidth can be increased in accordance with its channel condition.

Figure 5:
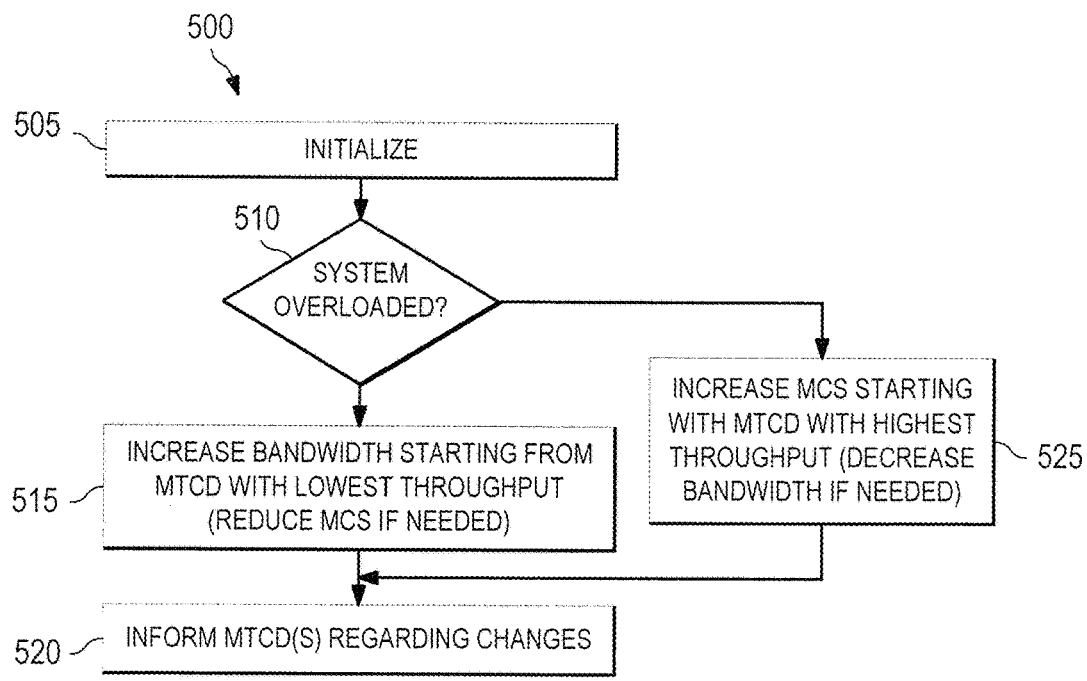
FIG. 5 illustrates a flow diagram of example operations occurring in an AP as the AP adjusts the transmission characteristics of MTCDs according to disclosed embodiments.

FIG. 5 illustrates a flow diagram of example operations 500 occurring in an AP as the AP adjusts the transmission characteristics of MTCDs. Operations 500 may occur in an AP, such as APs 105, 155, and 180, as the AP adjusts the transmission characteristics of channels of MTCDs.

Operations 500 may begin with the initialization of the communications system (block 505). According to an embodiment, the initialization may include a definition of possible transmission characteristics, e.g., possible MCS levels, as well as bandwidth choices. A plurality of signal waveforms with a variety of MCS levels and bandwidth choices may be defined. As an illustrative example, a minimum MCS level may be OQPSK modulation with a code rate of 1/3, while a highest MCS level may be dependent on the importance of energy efficiency, an example of which may be 16-QAM with a code rate of 3/4. Similarly, a minimum bandwidth may be set with consideration being given to radio-frequency limits of frequency offset. The number of MCS levels and/or bandwidth choices may be determined as a trade-off between overhead (e.g., signaling overhead required to signal changes, signaling overhead required to report channel condition, computational overhead required to adjust the bandwidth, the computational overhead required to determine load condition of the communications system, and the like) and performance.

The AP performs a check to determine if the communications system is overloaded (block 510). If the communications system, in particular, the AP, is under loaded, the AP may increase the bandwidth for at least some of its MTCDs (block 515). The increase in bandwidth for the at least some of the AP's MTCDs may be limited in accordance with load conditions of other APs in the communications system, including neighboring APs of the AP, and by the available capacity of the communications system. In general, the AP may increase the bandwidth by selecting a signal waveform with the desired bandwidth and/or MCS level. In an under loading situation, use of a low MCS level and a high bandwidth may be preferable for energy efficiency. For example, the AP may initialize all of its UEs at the lowest MCS level (QPSK rate 1/3 in this example). Thereafter, a maximum bandwidth that supports the QPSK rate 1/3 may be determined, and if the determined maximum bandwidth reaches a threshold value, the MCS level may be increased. The AP may allocate a maximum supported bandwidth at the lowest MCS level without repetition to the MTCDs. Higher MCS levels may be used if the MTCD can support those higher MCS levels with the maximum bandwidth. The AP may reduce the MCS level if needed while increasing the bandwidth. The AP may examine all of its MTCDs, starting with an MTCD with the lowest throughput, for example, and increase the bandwidth for the MTCDs that can benefit from the bandwidth increase. As an example, if the MTCD with the lowest throughput has a very low SINR, then the MTCD may not be a good candidate for a bandwidth increase. However, an MTCD with a medium or better SINR may be a good candidate for a bandwidth increase. According to an embodiment, the increase in bandwidth for an MTCD is selected in accordance with performance factors. Examples of performance factors include data transmission requirements of the MTCD (if the MTCD has very low data transmission requirements, it may not be advantageous to increase the bandwidth of the MTCD, for example), the channel condition of the MTCD, available capacity of the communications system, the number of MTCDs suitable for bandwidth increase, and the like.

If the AP made changes to the bandwidth (and/or MCS level) of any of its MTCDs, the AP informs the MTCD(s) of the change (block 520). The AP may broadcast information regarding the changes or it may individually transmit the information to the affected MTCDs.

If the communications system, in particular the AP, is overloaded, the AP may increase the MCS level for at least some of its MTCDs (block 525). In general, the AP may increase the MCS level by selecting a signal waveform with the desired MCS level and/or bandwidth. In an overloading situation, use of a low bandwidth and a high MCS level may be preferable to support as many users as possible. Therefore, spectral efficiency may be more important and the AP may use the minimum bandwidth and only increase the bandwidth if the MTCDs can support higher MCS levels with greater signal pulse bandwidth. The AP may reduce the bandwidth if needed while increasing the MCS level. The AP may examine all of its MTCDs, starting with an MTCD with the highest throughput, for example, and increase the MCS level for the MTCDs that can benefit from the MCS increase. If the AP made changes to the MCS level (and/or bandwidth) of any of its MTCDs, the AP informs the MTCD(s) of the change (block 520). The AP may broadcast information regarding the changes or it may individually transmit the information to the affected MTCDs.

It is noted that in a medium load situation, where the communications system is neither overloaded nor under loaded, the selection of bandwidth and/or MCS level may push the communications system into either overload or under load. In such a situation, the APs may initialize the MTCDs assuming that the communications system is in an under loaded condition to help preserve the battery power of the MTCDs. The AP may then gradually increase the MCS level of the MTCDs while reducing bandwidth (if needed) to support the higher MCS level. As an example, the MTCDs that are farther away from the AP may be prioritized since their batteries tend to deplete faster due to operation under low bandwidth conditions. In such a situation, MTCD throughput may be used as a deciding factor. As an illustrative example, an MTCD having the highest throughput may be selected and its MCS level may be increased and bandwidth may be decreased (if necessary).

Existing frame structure may not adequately support the adjustable pulse design described above. For example, in the current LTE system, the frame structure is based on a fixed transition time interval (TTI) length. The uplink and downlink transmission resources are scheduled per TTI and a minimum resource to be allocated is one physical resource block (PRB). Such design is geared toward supporting high throughput and large packets. In the present disclosure, the transmission is based on a single carrier waveform (e.g., SC-GFDM or SC-OQAM). The bandwidth and pulse length can vary to enable an acceptable tradeoff between throughput, energy efficiency and the number of connected MTCDs. In addition, LTE is based on OFDM and OFDMA, which requires accurate timing synchronization. In MTC systems, such accurate synchronization may not be feasible due to cost and overhead constraints.

Figure 6:
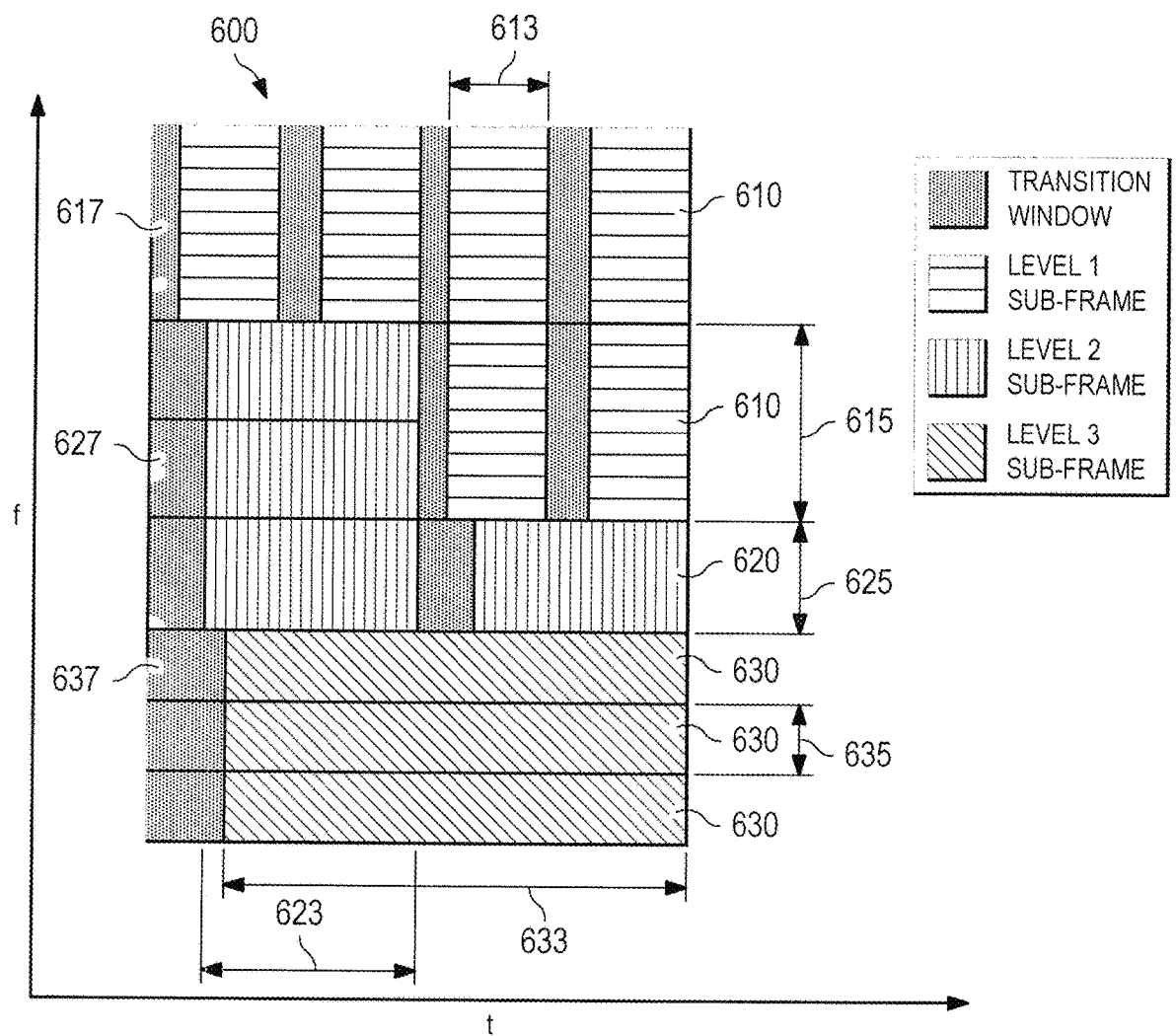
FIG. 6 illustrates an embodiment of a frame structure to support MTC multiple access with adjustable bandwidth and pulse length according to disclosed embodiments.

FIG. 6 illustrates an embodiment of a frame structure 600 to support MTC multiple access with adjustable bandwidth and pulse length. In the illustrated embodiment, the frame structure 600 is an uplink frame structure for MTC systems. The frame structure 600 illustrates a representation of a plurality of coverage levels. The coverage levels may be associated with a coverage range of an AP. In addition, each coverage level is associated with a sub-frame having a sub-frame length and a bandwidth. For example, the frame structure 600 includes a first or level 1 sub-frame 610, a second or level 2 sub-frame 620, and a third or level 3 sub-frame 630. The first sub-frame 610 includes a first sub-frame length 613 and a first bandwidth 615. The second sub-frame 620 includes a second sub-frame length 623 and a second bandwidth 625. Similarly, the third sub-frame 630 includes a third sub-frame length 633 and a third bandwidth 635.

In order to efficiently pack different coverage levels and sub-frames in the time-frequency resources and allow for a simple signaling scheme, an uplink frame structure is described that defines a finite number of signal pulse bandwidths, where a bandwidth of a given coverage level is an integer times the bandwidth of a next coverage level. For example, assuming three representative coverage levels within the frame structure, a bandwidth of a first coverage level may be 16×, a bandwidth of a second coverage level may be 4×, and a bandwidth of a third coverage level may be 1× (i.e., each level has a bandwidth four times as much as the next level). For each level, the sub-frame length is fixed, with the sub-frame length being inversely proportional to the signal pulse bandwidth. Therefore, a similar number of symbols in different levels of sub-frames and therefore a similar amount of data can be transmitted in each sub-frame. It is also possible to bundle multiple sub-frames in the time domain together to support larger packets.

For example, in the embodiment illustrated in FIG. 6, the MTC system may be allocated an amount of dedicated bandwidth and each uplink frame may have the same length. A finite set of sub-frame lengths and bandwidth levels is defined. In this example, three coverage levels are defined (e.g., level 1 associated with level 1 sub-frame 610, level 2 associated with level 2 sub-frame 620, and level 3 associated with level 3 sub-frame 630) with corresponding bandwidths (e.g., first bandwidth 615, second bandwidth 625, and third bandwidth 635) equal to 64 kHz, 16 kHz, and 4 kHz, respectively. The first sub-frame length 613 is inversely proportional to the first bandwidth 615, the second sub-frame length 623 is inversely proportional to the second bandwidth 625 and the third sub-frame length 633 is inversely proportional to the third bandwidth 635. In the illustrated embodiment, the first sub-frame length 613 may be 4 ms, the second sub-frame length may be 16 ms, and the third sub-frame length may be 64 ms. It should be noted that while the particular embodiment described for the frame structure 600 is described as having three coverage levels, those skilled in the art will readily recognize that more than three or less than three coverage levels can be implemented without departing from the scope of the present disclosure.

To support the potential timing mismatch due to inaccurate uplink timing synchronization, a transition window is used in the beginning of each sub-frame. For example, a first transition window 617 is used in the beginning of the level 1 sub-frame 610, a second transition window 627 is used in the beginning of the level 2 sub-frame 620, and a third transition window 637 is used in the beginning of the level 3 sub-frame 630. The length of the transition window represents an overhead of the respective sub-frame.

When the candidate waveform of SC-GFDM is used, the transition window can be a combination of time windowing and cyclic-prefix (CP). The time windowing is used to smooth the spectrum of SC-GFDM signals as well as to provide extra cushion to combat interference due to a timing mismatch of signals for different MTCDs using adjacent slots.

For efficient resource packing, it is contemplated that two frame partition methods can be used as illustrated in FIGS. 7A-7C: i) different levels of sub-frames are frequency division multiplexed (FDM) as illustrated at 710 (i.e., FDM method); ii) in addition to being FDM, different levels of sub-frames are also time division multiplexed (TDM) as illustrated at 720 (i.e., FDM+TDM method). FIGS. 7A and 7B illustrate the two frame partition methods. The FDM method 710 illustrated in FIG. 7A requires less signaling overhead because fewer bits are required to notify the MTCDs about the frame structure. However, the FDM method 710 provides less granularity in partition of the total resources to multiple levels. The FDM+TDM method 720 illustrated in FIG. 7B provides more flexibility in partitioning the resources but requires slightly more bits to define the frame structure. To mitigate this effect, in an embodiment only one of the bands in each level is allowed to be TDM with bands of an adjacent level. The order of bands at different levels should also be pre-defined for minimum signaling.

As illustrated in FIGS. 7A and 7B, sub-frames 730 having the largest bandwidth are placed on top of the spectrum. Another way to place the sub-frames 730 is to put the sub-frames with the largest bandwidth in the middle of the spectrum as illustrated in FIG. 7C while the sub-frames 740 with the narrowest bandwidth are placed in both the top and the bottom of the spectrum. If frequency hopping is used, such placement allows the MTCDs that require the highest coverage to fully exploit the frequency diversity of the channel.

In addition to the above resource mapping method, the following mechanism can be used to improve the robustness of the system to timing mismatch of adjacent sub-frames due to inaccurate synchronization:

1). MTCDs with close SINR can be scheduled at consecutive slots as their arrival timing is similar. This is because MTCDs with adjacent SINR are likely to experience similar propagation delay. Therefore, there is less timing mismatch between them due to lack of timing advanced (TA) signaling.

2). Only the same or adjacent levels are placed in consecutive time slots. The reason for this placement is the same as in 1) above.

3). The use of long signal pulse in high coverage levels also reduces potential interference.

4). Frequency hopping can be used to reduce potential interference.

The boundaries of the frames for MTC can be aligned with the frame boundaries of mobile broadband transmission. Such alignment can benefit MTC users as MTC users can easily take advantage of existing downlink mobile broadband channels. For example, MTC users can use the downlink synchronization channel of existing mobile broadband systems for timing synchronization and tracking if the boundaries of frames are aligned. As another example, MTC users can use the broadcast channel of mobile broadband transmission to obtain system information. The mobile broadband transmission may include mobile transmission based on current LTE system, WiMAX system, or any other mobile broadband systems.

In the beginning of each frame, frame resource partition information may be broadcast as part of the system information. The frame resource partition information can be represented by the number of frequency bands used for each level of sub-frame. Thereafter, scheduling control information can be sent to inform the MTCD of the sub-frames that the MTCD should use for uplink transmission. This control information can include one or more of the terminal identification (ID) information (e.g., an MTCD temporal ID or an MTCD group ID), the starting index of the sub-frames, and the number of sub-frames used for each transmission (if more than one). The signal pulse bandwidth and the modulation and coding scheme (MCS) level can be signaled once and updated only if needed. The index for locating each sub-frame can be simplified by using one index instead of two separate indices for representing time and frequency.

For MTCDs that periodically report information at predictable time and packet size, semi-persistent scheduling can be used. When semi-persistent scheduling is applied, the scheduling information is only sent once and the MTCD will transmit at the pre-defined sub-frame location at a fixed interval until receiving further signaling from the network. Semi-persistent scheduling reduces the amount of signaling overhead compared to scheduling every TTI. For other types of traffic, because the delay tolerance is higher for MTC, scheduling in advance on a per-frame basis can also reduce the overhead compared to scheduling every TTI as used in LTE.

Figure 8A:
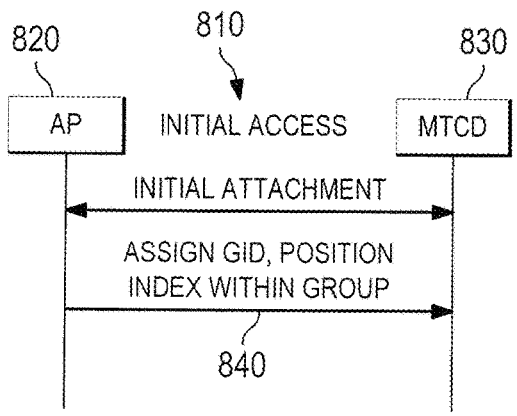
FIGS. 8A and 8B illustrate a method for group based resource assignment for MTC according to disclosed embodiments.
Figure 8B:
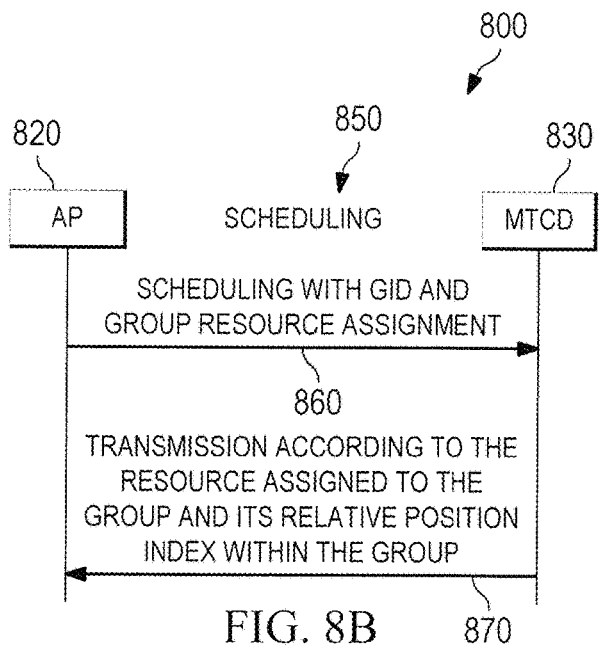

In addition to the signaling schemes described above, group based scheduling can significantly reduce the scheduling information that is broadcast to the MTCDs. FIGS. 8A and 8B illustrate a proposed method 800 for group based resource assignment for MTC. In an initial access process 810, an AP 820 assigns a group ID (GID) to an MTCD 830 along with a position index within the group (step 840) to define the relative position of the resources that the MTCD 830 uses with respect to the resources assigned to the group. In a scheduling process 850, instead of explicitly scheduling each terminal, the AP 820 schedules the resource assignment for each group by specifying the group ID (GID) assigned in the initial attachment process and the associated resource assignment (step 860). Each individual MTCD 830 transmits the uplink data according to the resources assigned to the group as well as its own position index within the group (step 870).

Figure 9:
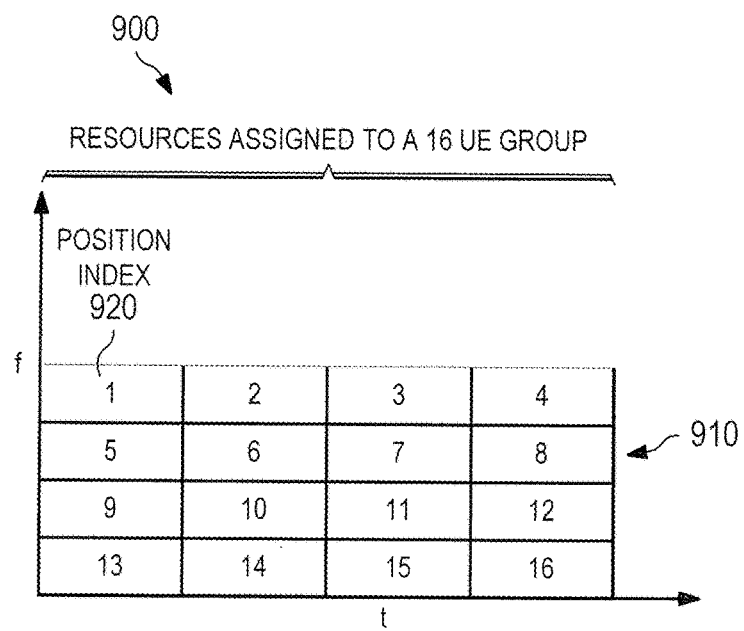
FIG. 9 illustrates an example of resource assignment of an MTCD group according to disclosed embodiments.

FIG. 9 illustrates an example 900 of resource assignment of an MTCD group. In FIG. 9, the time-frequency resources assigned to a 16-MTCD group 910 and a position index 920 for each individual MTCD are illustrated. The groups can be formed based on having similar quality of service (QoS) requirements (e.g., latency requirement, data load, traffic type, etc.) or similar location (e.g., MTCDs that are co-located or that are a similar distance from the AP). If there is a dedicated control device for the group, the position index of each MTCD within the group can be locally assigned by the group control device.

To illustrate the multi-level frame structure and the multiple access of the proposed MTC system, reference is made to Tables 1-4 below and FIGS. 10-12 where an example is given illustrating bandwidth assignments, frame partitioning and the scheduling process.

As described above with respect to FIG. 6, the MTC system may be allocated an amount of dedicated bandwidth and each uplink frame may have the same length. For example, the MTC system is allocated 1.08 MHz of dedicated bandwidth and each uplink frame is designed at a length of 2.048 seconds. A finite set of sub-frame length and bandwidth levels is defined. For example, Table 1 below illustrates parameters of sub-frames at different coverage levels. To illustrate, four coverage levels are defined having corresponding bandwidths equal to 1 kHz, 4 kHz, 16 kHz, and 64 kHz, respectively. As illustrated, each coverage level has a bandwidth four times as much as the next coverage level. In addition, for each coverage level, the sub-frame length is fixed, with the sub-frame length being inversely proportional to the signal pulse bandwidth. Note that due to the use of the transition window, the number of QAM symbols per sub-frame is reduced. For example, if the sub-frame length is 4 ms and the symbol duration or length is 31.25 μs, the number of QAM symbols per sub-frame is less than 128 (i.e., 4 ms/31.25 μs=128) due to the overhead of the length of the transition window in the sub-frame.

FIG. 10 illustrates different levels of sub-frames inside an uplink frame 1000. For example, a level 1 sub-frame 1010 has a sub-frame length of 4 ms and a bandwidth of 64 kHz, a level 2 sub-frame 1020 has a sub-frame length of 16 ms and a bandwidth of 16 kHz, a level 3 sub-frame 1030 has a sub-frame length of 64 ms and a bandwidth of 4 kHz, and a level 4 sub-frame 1040 has a sub-frame length of 256 ms and a bandwidth of 1 kHz.

TABLE 1

| Coverage Level | BW | Symbol length | Sub-frame | # of QAM symbols per SF |
|---|---|---|---|---|
| 1 | 64 khz | 31.25 us | 4 ms | <128 |
| 2 | 16 khz | 125 us | 16 ms | <128 |
| 3 | 4 khz | 0.5 ms | 64 ms | <128 |
| 4 | 1 khz | 2 ms | 256 ms | <128 |

Table 2 below illustrates SNR calculation for MTCDs at different distances from the AP. For example, Group 1 is a first group of MTCDs at a distance of 100 meters from the AP, and as a result the MTCDs in the first group have a similar SNR. Similarly, Group 2 is a second group of MTCDs at a distance of 200 meters from the AP, and as a result the MTCDs in the second group have a similar SNR, Group 3 is a third group of MTCDs at a distance of 300 meters from the AP, and as a result the MTCDs in the third group have a similar SNR, etc. The received SNR for each representative MTCD group at a reference bandwidth of 64 kHz and a reference bandwidth of 1 kHz is shown.

TABLE 2

| MTCD group | Distance to AP (R) | PL = 120.9 + 37.6 log (R) | Receive SNR at reference BW = 64 khz | Receive SNR at BW = 1 khz |
|---|---|---|---|---|
| Group 1 | 100 m | 83.3 | 60.6 | 78.7 |
| Group 2 | 200 m | 94.6 | 49.3 | 67.4 |
| Group 3 | 500 m | 109.6 | 34.4 | 52.4 |
| Group 4 | 1 km | 120.9 | 23.0 | 41.1 |
| Group 5 | 2 km | 132.2 | 11.7 | 29.8 |
| Group 6 | 4 km | 143.5 | 0.4 | 18.5 |
| Group 7 | 6 km | 150.2 | −6.2 | 11.8 |
| Group 8 | 8 km | 154.8 | −10.9 | 7.1 |
| Group 9 | 10 km | 158.5 | −14.6 | 3.5 |
| Group 10 | 15 km | 165.1 | −25.9 | −3.1 |

The bandwidth (BW) and the modulation and coding scheme (MCS) are then assigned to each MTCD as described above with respect to FIG. 5. For calculating the load, it is assumed in this illustrative embodiment that each group represents 100k MTCDs, with a total of 1 million MTCDs to be covered by one base station. The data load for each MTCD is assumed to be one report per 30 minutes, with a packet size equal to 1000 bits and overall overhead of 10%. The solution for the BW and MCS assignment is recorded as illustrated in Table 3 below. The amount of resources that should be allocated to different coverage levels is then computed, with the results shown in Table 4 below.

TABLE 3

| Typical MTCD for a MTCD group | Maximum BW to support QPSK, ⅓ | SNR at respective BW | MCS choices |
|---|---|---|---|
| MTCD1 | 64k | 60.6 | 16QAM, ¾ |
| MTCD2 | 64k | 49.3 | 16QAM, ¾ |
| MTCD3 | 64k | 34.4 | 16QAM, ¾ |
| MTCD4 | 64k | 23.0 | 16QAM, ¾ |
| MTCD5 | 64k | 11.7 | 16QAM, ¾ |
| MTCD6 | 4k | 12.4 | 16QAM, ¾ |
| MTCD7 | 4k | 5.8 | OQPSK, ¾ |
| MTCD8 | 4k | 1.1 | OQPSK, ⅓ |
| MTCD9 | 1k | 3.5 | OQPSK, ½ |
| MTCD10 | 1k | −3.1 | OQPSK, ⅓, 2x |

TABLE 4

| CL | BW | Portion of resources | Frequency resources | Num of bands |
|---|---|---|---|---|
| 1 | 64k | 28.27% | 304.2k | 4.75 |
| 2 | 16k | 0 | 0 | 0 |
| 3 | 4k | 42.25% | 456.3k | 110 + 25% TDM w/ one lv1 band |
| 4 | 1k | 29.58% | 319.4k | 320 |

Figure 12A:
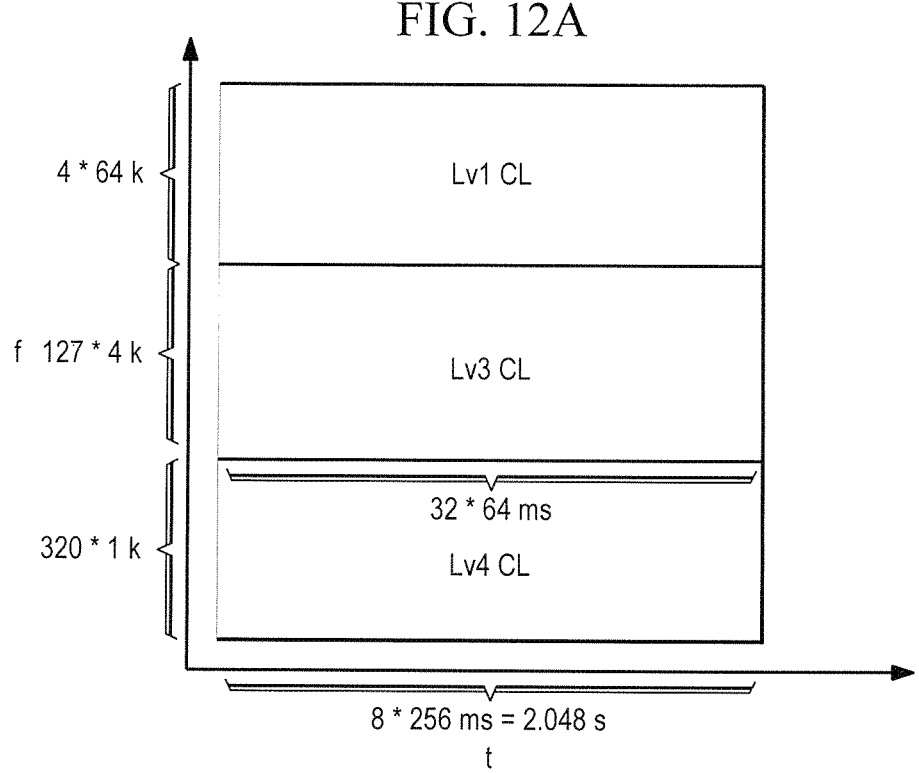
FIGS. 12A and 12B illustrate frame partition based only on FDM according to disclosed embodiments.
Figure 12B:
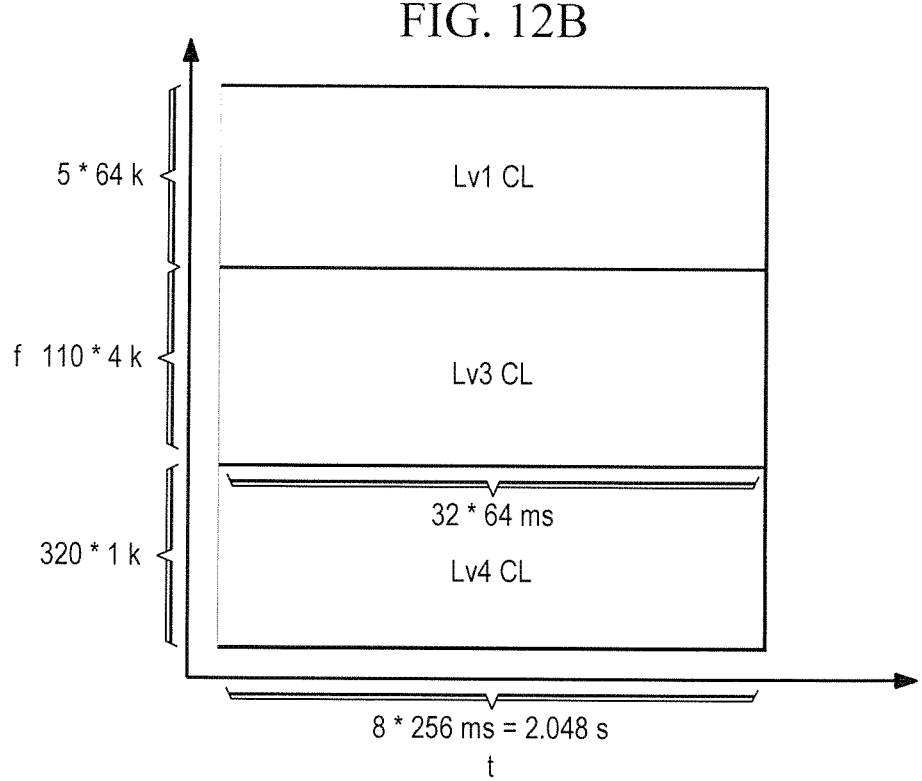

After computing the number of bands needed for each coverage level, the resource mapping of different levels of sub-frames inside 2.048 seconds of uplink frame is shown in FIG. 11. In FIG. 11, both FDM and TDM for different coverage levels are used. Alternatively, FDM based frame partition only can be used as illustrated in FIGS. 12A and 12B, but the number of bands for the level 1 frame may change from 4 as illustrated in FIG. 12A to 5 as illustrated in FIG. 12B over time to balance the traffic that is assigned to different sub-frames.

After the frame partition, the amount of signaling required for scheduling is evaluated as follows. For frame partition information, because the maximum number of bands for the 64k BW is 16 (i.e., total BW is 1024k, so maximum number of bands for 64k BW is 1024/64=16), 4 bits are enough to represent the number of frequency bands used for sub-frames of coverage level 1. Similarly, 6 bits are used for coverage level 2 (16k BW), and 8 bits are used for coverage level 3 (4k BW). Therefore, a total of 18 bits is enough to define the frame partitions.

For scheduling assignment, the maximum number of sub-frames for all the four coverage levels is 8192. To illustrate, the total frequency and time resource area is 1024 kHz*2.048 s; each sub-frame has an area of 256 (e.g., 64 kHz*4 mS, 16 kHz*16 ms, etc.). Therefore in this illustrative example, 13 bits are enough to locate any sub-frame within one 2-second uplink frame for any per-frame scheduling assignment. Note that for a significant number of MTCDs with periodic-report type traffic, semi-persistent scheduling means that they only need to be scheduled once and only new MTCDs that have not been scheduled earlier need to be signaled. Finally, group based assignment further reduces the number of MTCDs or MTCD groups that need to be addressed.

Figure 13A:
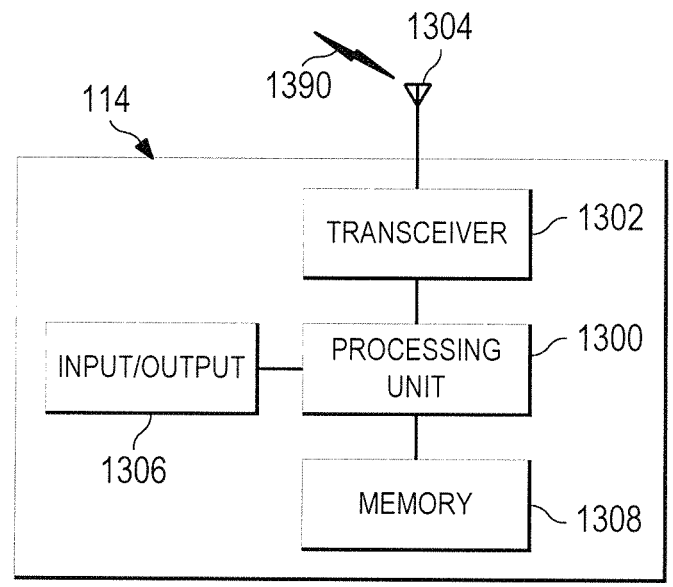
FIGS. 13A and 13B illustrate example devices that can implement frame structure for machine-type communications with adjustable pulse bandwidth according to disclosed embodiments.
Figure 13B:
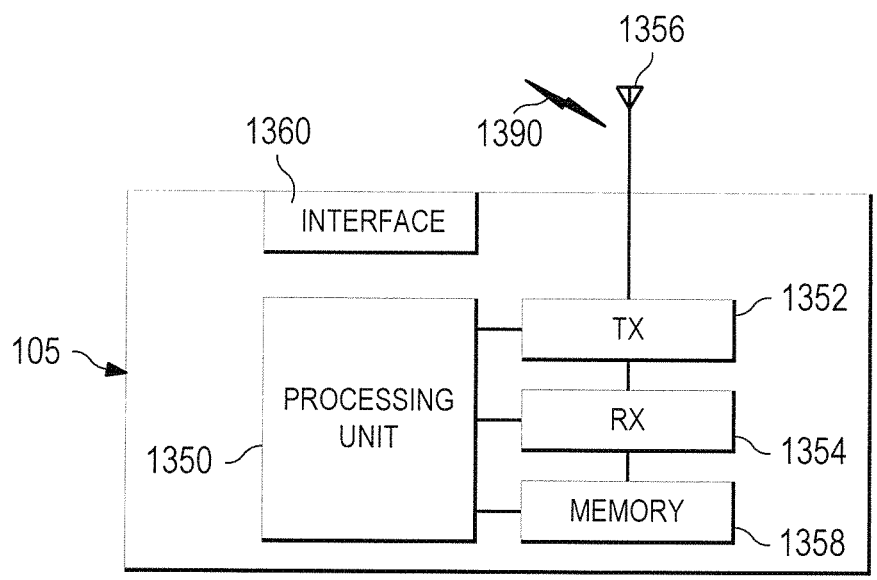

FIGS. 13A and 13B illustrate example devices that may implement the methods and teachings according to this disclosure. In particular, FIG. 13A illustrates an example electronic device, such as the MTCD 114, and FIG. 13B illustrates an example base station 105, such as an AP. These components could be used in the system 100 or in any other suitable system.

As shown in FIG. 13A, the MTCD 114 includes at least one processing unit 1300. The processing unit 1300 implements various processing operations of the MTCD 114. For example, the processing unit 1300 could perform signal coding, data processing, power control, input/output processing, or any other functionality enabling the MTCD 114 to operate in the system 100. To illustrate, the processing unit 1300 is configured to process communications requirements from an MTCD. The communications requirements may specify parameters, such as a coverage requirement, a communications system load, MTCD geometry, MTCD power consumption, frequency or period of transmissions from the MTCD, an amount of information transmitted per transmission, a priority level of the communications, and the like.

The processing unit 1300 is configured to assign a signal waveform to an MTCD in accordance with communications requirements of the MTCD and can allocate communications resources for the MTCD in accordance with the communications requirements. The processing unit 1300 is configured to consider communications requirements from MTCDs served by the base station 105, conditions of a communications system that includes the base station 105, and the like.

The processing unit 1300 is configured to adjust transmission parameters, e.g., bandwidth and/or MCS level, of the MTCD 114. The processing unit 1300 is configured to consider communications system load, as well as channel condition (e.g., SINR, SNR, and the like), as it adjusts the bandwidth and/or MCS level. The processing unit 1300 is configured to generate signaling to inform MTCDs regarding any adjustments in their bandwidth and/or MCS level.

The processing unit 1300 also supports the methods and teachings described in more detail above. Each processing unit 1300 includes any suitable processing or computing device configured to perform one or more operations. Each processing unit 1300 could, for example, include a microprocessor, microcontroller, digital signal processor, field programmable gate array, or application specific integrated circuit.

The MTCD 114 also includes at least one transceiver 1302. The transceiver 1302 is configured to modulate data or other content for transmission by at least one antenna or NIC (Network Interface Controller) 1304. The transceiver 1302 is also configured to demodulate data or other content received by the at least one antenna 1304. Each transceiver 1302 includes any suitable structure for generating signals for wireless or wired transmission and/or processing signals received wirelessly or by wire. Each antenna 1304 includes any suitable structure for transmitting and/or receiving wireless or wired signals. One or multiple transceivers 1302 could be used in the MTCD 114, and one or multiple antennas 1304 could be used in the MTCD 114. Although shown as a single functional unit, a transceiver 1302 could also be implemented using at least one transmitter and at least one separate receiver.

The MTCD 114 can further include one or more input/output devices 1306 or interfaces (such as a wired interface to the internet). The input/output devices 1306 facilitate interaction with a user or other devices (network communications) in the network. Each input/output device 1306 includes any suitable structure for providing information to or receiving/providing information from a user, such as a speaker, microphone, keypad, keyboard, display, or touch screen, including network interface communications.

In addition, the MTCD 114 includes at least one memory 1308. The memory 1308 stores instructions and data used, generated, or collected by the MTCD 114. For example, the memory 1308 could store software or firmware instructions executed by the processing unit(s) 1300 such as transmission parameters, communications requirements, resource allocations, resource allocation information, channel parameters, bandwidth assignments, MCS level assignments, channel condition, communications system load, and the like. Each memory 1308 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 13B, the base station 105 includes at least one processing unit 1350, at least one transmitter 1352, at least one receiver 1354, one or more antennas 1356, one or more network interfaces 1360, and at least one memory 1358. The base station 105 communicates with one or more of the MTCDs 114 over one or more air interfaces 1390 using wireless communication links. The air interfaces 1390 may utilize any suitable radio access technology.

The processing unit 1350 implements various processing operations of the base station 1370, such as signal coding, data processing, power control, input/output processing, or any other functionality.

The processing unit 1350 can also support the methods and teachings described in more detail above. Each processing unit 1350 includes any suitable processing or computing device configured to perform one or more operations. Each processing unit 1350 could, for example, include a microprocessor, microcontroller, digital signal processor, field programmable gate array, or application specific integrated circuit.

The processing unit 1350 is configured to process communications requirements from an MTCD. The communications requirements may specify parameters, such as coverage requirement, a communications system load, MTCD geometry, MTCD power consumption, frequency or period of transmissions from the MTCD, an amount of information transmitted per transmission, a priority level of the communications, and the like. The processing unit 1350 is configured assign a signal waveform to an MTCD in accordance with communications requirements of the MTCD. The processing unit 1350 is configured to select the signal waveform from a plurality of signal waveforms. The processing unit 1350 is configured to allocate communications resources for the MTCD in accordance with the communications requirements. The processing unit 1350 is configured to consider communications requirements from MTCDs served by the MTCD 114, condition of a communications system that includes the MTCD 114, and the like.

The processing unit 1350 is configured to adjust transmission parameters, e.g., bandwidth and/or MCS level, of an MTCD. The processing unit 1350 is configured to consider communications system load, as well as channel condition (e.g., SINR, SNR, and the like), as it adjusts the bandwidth and/or MCS level. The processing unit 1350 is configured to generate signaling to inform MTCDs regarding any adjustments in their bandwidth and/or MCS level.

Each transmitter 1352 includes any suitable structure for generating signals for wireless or wired transmission to one or more MTCDs or other devices. Each receiver 1354 includes any suitable structure for processing signals received wirelessly or by wire from one or more MTCDs or other devices. Although shown as separate components, at least one transmitter 1352 and at least one receiver 1354 could be combined into a transceiver. Each antenna 1356 includes any suitable structure for transmitting and/or receiving wireless or wired signals. While a common antenna 1356 is shown here as being coupled to both the transmitter 1352 and the receiver 1354, one or more antennas 1356 could be coupled to the transmitter(s) 1352, and one or more separate antennas 1356 could be coupled to the receiver(s) 1354. Each memory 1358 includes any suitable volatile and/or non-volatile storage and retrieval device(s). The memory 1358 is configured to store transmission parameters, communications requirements and/or conditions, resource allocations, resource allocation information, channel parameters, bandwidth assignments, MCS level assignments, channel condition, communications system load, and the like.

In some embodiments, some or all of the functions or processes of the one or more of the devices are implemented or supported by a computer program that is foil led from computer readable program code and that is embodied in a computer readable medium. The phrase computer readable program code includes any type of computer code, including source code, object code, and executable code. The phrase computer readable medium includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms include and comprise, as well as derivatives thereof, mean inclusion without limitation. The terms or is inclusive, meaning and/or. The phrases associated with and associated therewith, as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for providing a frame structure for machine-type communication in a wireless communication system, the communication system comprising a base station and a plurality of machine-type communication devices (MTCDs), the method comprising:

dividing, by the base station, a frame of time-frequency space into at least one first sub-frame and at least one second sub-frame, the at least one first sub-frame associated with a first MTCD of the plurality of MTCDs, the first MTCD within a first coverage level of the base station, the at least one first sub-frame having a first sub-frame length and a first signal pulse bandwidth;

the at least one second sub-frame associated with a second MTCD of the plurality of MTCDs, the second MTCD within a second coverage level of the base station different from the first coverage level, the at least one second sub-frame having a second sub-frame length different from the first sub-frame length and a second signal pulse bandwidth different from the first signal pulse bandwidth; and transmitting, by the base station, information about the at least one first sub-frame to the first MTCD.

2. The method according to claim 1, wherein dividing the frame into the at least one first sub-frame comprises dividing the frame into a plurality of first sub-frames and dividing the frame into the at least one second sub-frame comprises dividing the frame into a plurality of second sub-frames, each first sub-frame having equal length and each second sub-frame having equal length.

3. The method according to claim 2, wherein a magnitude of the first sub-frame length multiplied by the first signal pulse bandwidth is equal to a magnitude of the second sub-frame length multiplied by the second signal pulse bandwidth.

4. The method according to claim 2, wherein the second sub-frame length is an integer number times the first sub-frame length.

5. The method according to claim 2, further comprising dividing the frame into the plurality of first sub-frames and the plurality of second sub-frames using frequency division multiplexing.

6. The method according to claim 5, further comprising dividing the frame into the plurality of first sub-frames and the plurality of second sub-frames using time division multiplexing.

7. The method according to claim 2, wherein the transmitted information comprises scheduling control information.

8. The method according to claim 7, wherein the scheduling control information comprises one or more of terminal identification information, a starting index of the at least one first sub-frame, or a number of sub-frames used for each transmission.

9. The method according to claim 7, wherein the scheduling control information comprises group based scheduling information, wherein the group based scheduling information comprises a group identification assigned to the first MTCD and a position index within a group of MTCDs, wherein the base station schedules a resource assignment for each group of MTCDs by specifying the group identification.

10. The method according to claim 9, wherein the group of MTCDs is formed in accordance with one or more of similar quality of service requirements or similar geographic location.

11. The method according to claim 1, wherein transmitting the information about the at least one sub-frame comprises transmitting scheduling information about the at least one sub-frame to the first MTCD.

12. A base station for providing a frame structure for machine-type communication in a wireless communication system, the communication system comprising a plurality of machine-type communication devices (MTCDs) coupled to the base station, the base station comprising:
a processor; and
memory coupled to the processor including instructions that, when executed by the processor, cause the base station to:
divide a frame of time-frequency space into at least one first sub-frame and at least one second sub-frame, the at least one first sub-frame associated with a first MTCD of the plurality of MTCDs, the first MTCD within a first coverage level of the base station, the at least one first sub-frame having a first sub-frame length and a first signal pulse bandwidth;
the at least one second sub-frame associated with a second MTCD of the plurality of MTCDs different from the first MTCD, the second MTCD within a second coverage level of the base station different from the first coverage level, the at least one second sub-frame having a second sub-frame length different from the first sub-frame length and a second signal pulse bandwidth different from the first signal pulse bandwidth; and
transmit information about the at least one first sub-frame to the first MTCD.

13. The base station according to claim 12, further including instructions that, when executed by the processor, cause the base station to divide the at least one first sub-frame into a plurality of first sub-frames and divide the at least one second sub-frame into a plurality of second sub-frames, wherein each first sub-frame has equal length and each second sub-frame has equal length.

14. The base station according to claim 13, further including instructions that, when executed by the processor, cause the base station to divide the frame into the plurality of first sub-frames and the plurality of second sub-frames using frequency division multiplexing.

15. The base station according to claim 14, further including instructions that, when executed by the processor, cause the base station to divide the frame into the plurality of first sub-frames and the plurality of second sub-frames using time division multiplexing.

16. The base station according to claim 13, wherein the instructions that, when executed by the processor, cause the base station to transmit the information about the at least one sub-frame comprise instructions that, when executed by the processor, cause the base station to transmit scheduling information about the at least one sub-frame to the first MTCD.

17. The base station according to claim 12, wherein the first sub-frame comprises a transition window for timing synchronization between consecutive sub-frames within the frame structure, and wherein a boundary of the first sub-frame is aligned with a frame boundary for mobile broadband transmission.

18. A method for operating a machine-type communication device (MTCD) in a wireless communication system, the communication system comprising a base station coupled to a plurality of MTCDs, the method comprising:
receiving, by a first MTCD of the plurality of MTCDs, information associated with a frame of time-frequency space divided into at least one first sub-frame and at least one second sub-frame from the base station, the at least one first sub-frame associated with a first coverage level of the base station within which the first MTCD is in, the at least one first sub-frame having a first sub-frame length and a first signal pulse bandwidth, the at least one second sub-frame associated with a second MTCD of the plurality of MTCDs different from the first MTCD, the second MTCD within a second coverage level of the base station different from the first coverage level, the at least one second sub-frame having a second sub-frame length different from the first sub-frame length and a second signal pulse bandwidth different from the first signal pulse bandwidth;
generating, by the first MTCD, a packet including data, the packet generated in accordance with the at least one first sub-frame; and
transmitting, by the first MTCD, the packet to the base station.

19. The method according to claim 18, wherein the at least one first sub-frame comprises a plurality of first sub-frames and the at least one second sub-frame comprises a plurality of second sub-frames, wherein each first sub-frame has equal length and each second sub-frame has equal length.

20. The method according to claim 19, wherein a magnitude of the first sub-frame length multiplied by the first signal pulse bandwidth is equal to a magnitude of the second sub-frame length multiplied by the second signal pulse bandwidth.

21. The method according to claim 18, wherein the first sub-frame comprises a transition window for timing synchronization between consecutive sub-frames within the frame.

22. The method according to claim 21, wherein the transition window comprises one or more of a time window, a cyclic prefix or a time cushion.

23. The method according to claim 18, wherein a boundary of the first sub-frame is aligned with a frame boundary for mobile broadband transmission.

24. A first machine-type communication device (MTCD) for communicating in a wireless communication system, the communication system comprising a base station coupled to a plurality of MTCDs, the first MTCD comprising:
a processor; and
memory coupled to the processor including instructions that, when executed by the processor, cause the first MTCD to:
receive information associated with a frame of time-frequency space divided into at least one first sub-frame and at least one second sub-frame from the base station, the at least one first sub-frame associated with a first coverage level of the base station within which the first MTCD is in, the at least one first sub-frame having a first sub-frame length and a first signal pulse bandwidth, the at least one second sub-frame associated with a second MTCD of the plurality of MTCDs different from the first MTCD, the second MTCD within a second coverage level of the base station different from the first coverage level, the at least one second sub-frame having a second sub-frame length different from the first sub-frame length and a second signal pulse bandwidth different from the first signal pulse bandwidth;
generate a packet including data, the packet generated in accordance with the at least one first sub-frame; and
transmit the packet to the base station.

25. The first MTCD according to claim 24, wherein the at least one first sub-frame comprises a plurality of first sub-frames and the at least one second sub-frame comprises a plurality of second sub-frames, wherein each first sub-frame has equal length and each second sub-frame has equal length.

26. The first MTCD according to claim 25, wherein a magnitude of the first sub-frame length multiplied by the first signal pulse bandwidth is equal to a magnitude of the second sub-frame length multiplied by the second signal pulse bandwidth.

27. The first MTCD according to claim 25, wherein the first sub-frame comprises a transition window for timing synchronization between consecutive sub-frames within the frame, and wherein a boundary of the first sub-frame is aligned with a frame boundary for mobile broadband transmission.

28. The first MTCD according to claim 24, wherein the first sub-frame comprises a transition window for timing synchronization between consecutive sub-frames within the frame.

29. The first MTCD according to claim 28, wherein the transition window comprises one or more of a time window, a cyclic prefix or a time cushion.

* * * * *